US011775641B2

(12) United States Patent
Vasilenko et al.

(10) Patent No.: US 11,775,641 B2
(45) Date of Patent: Oct. 3, 2023

(54) SYSTEMS AND METHODS FOR CLASSIFYING MALWARE BASED ON FEATURE REUSE

(71) Applicant: VMware, Inc., Palo Alto, CA (US)

(72) Inventors: Roman Vasilenko, Oceanside, CA (US); Corrado Raimondo, London (GB)

(73) Assignee: VMware, Inc., Palo Alto, CA (US)

( * ) Notice: Subject to any disclaimer, the term of this patent is extended or adjusted under 35 U.S.C. 154(b) by 315 days.

(21) Appl. No.: 17/092,027

(22) Filed: Nov. 6, 2020

(65) Prior Publication Data

US 2022/0147629 A1    May 12, 2022

(51) Int. Cl.
| | |
|---|---|
| *G06F 21/56* | (2013.01) |
| *G06F 16/22* | (2019.01) |
| *G06N 20/00* | (2019.01) |
| *G06F 9/54* | (2006.01) |

(52) U.S. Cl.
CPC .............. *G06F 21/566* (2013.01); *G06F 9/54* (2013.01); *G06F 16/2255* (2019.01); *G06N 20/00* (2019.01); *G06F 2221/033* (2013.01)

(58) Field of Classification Search
None
See application file for complete search history.

(56) References Cited

U.S. PATENT DOCUMENTS

| | | | |
|---|---|---|---|
| 11,556,862 B2* | 1/2023 | Polleri | G06F 11/302 |
| 11,637,859 B1* | 4/2023 | Johns | G06F 21/56 726/23 |
| 2016/0379136 A1* | 12/2016 | Chen | G06F 21/552 706/14 |
| 2018/0278635 A1* | 9/2018 | Shin | H04L 45/64 |
| 2019/0132334 A1* | 5/2019 | Johns | H04L 63/145 |
| 2019/0228154 A1* | 7/2019 | Agrawal | G06N 3/045 |

(Continued)

OTHER PUBLICATIONS

Santos et al.; Opcode sequences as representation of executables . . . ; 2011; retrieved from the internet https://www.sciencedirect.com/science/article/pii/S0020025511004336; pp. 1-19, as printed. (Year: 2011).*

(Continued)

*Primary Examiner* — Michael W Chao
(74) *Attorney, Agent, or Firm* — Kim & Stewart LLP

(57) ABSTRACT

Systems and methods for classifying malware based on the frequency of feature reuse are provided. The system can identify a malicious feature frequency, a benign feature frequency, and a first weight value. The system can generate a first reuse vector based on the malicious feature frequency and the benign feature frequency. The system can determine that a training binary associated with a known classification includes the first feature and a second feature, the second feature associated with a second reuse vector and a second weight value. The system can construct, responsive to the determination that the first binary includes the first feature and the second feature, a reuse tensor using the first reuse vector, the second reuse vector, the first weight value, and the second weight value. The system can train a malware classification model using the reuse tensor and the known classification associated with the training binary.

24 Claims, 8 Drawing Sheets

(56) References Cited

U.S. PATENT DOCUMENTS

2022/0109685 A1* 4/2022 Hankins .............. H04L 63/0227
2022/0121744 A1* 4/2022 Mishra ..................... G06N 3/04

OTHER PUBLICATIONS

Ji et al.; A survey on Tensor Techniques and Applications in Machine Learning; 2019; Retrieved from the Internet https://ieeexplore.ieee.org/abstract/document/8884203/; pp. 1-41, as printed. (Year: 2019).*

* cited by examiner

SYSTEMS AND METHODS FOR CLASSIFYING MALWARE BASED ON FEATURE REUSE

BACKGROUND

The present invention relates generally to the field of computer security. In general, a computing device may have one or more vulnerabilities that can be leveraged by malicious code to compromise the computing device. Malicious code may also be introduced onto a computing device by deceiving a user. Malicious code running on a compromised machine may install additional malware components. Computer security is improved through the detection of malicious software ("malware") that either uses malicious code to exploit vulnerabilities (or deceive users) and repurpose infected computers or performs malicious actions once installed on a compromised host. Once malware is detected and the exploits are understood, security systems may be designed to recognize and block the malware and the vulnerabilities may be patched.

BRIEF SUMMARY

At least one aspect of this technical solution is broadly related to a system for classifying malware based on the frequency of feature reuse. The system can include a data processing system comprising one or more processors coupled to a memory. The system can identify, from a database: (1) a malicious feature frequency corresponding to a number of occurrences of a first feature in a plurality of known malicious binaries, (2) a benign feature frequency corresponding to a number of occurrences of the first feature in a plurality of known benign binaries, and (3) a first weight value of the first feature corresponding to the size of the first feature. The system can generate a first reuse vector based on the malicious feature frequency and the benign feature frequency. The first reuse vector can have a first coordinate corresponding to a malicious threshold range and a second coordinate corresponding to a benign threshold range. The system can determine that a training binary associated with a known classification includes the first feature and a second feature. The second feature can be associated with a second reuse vector and a second weight value corresponding to the size of the second feature. The system can construct, responsive to the determination that the first binary includes the first feature and the second feature, a reuse tensor using the first reuse vector, the second reuse vector, the first weight value, and the second weight value. The system can train a malware classification model using the reuse tensor and the known classification associated with the first binary.

In some implementations, the system can determine that the malicious feature frequency falls within the malicious threshold range. In some implementations, the system can set the first coordinate of the first reuse vector to a match value responsive to the determination that the malicious feature frequency falls within the malicious threshold range. In some implementations, the system can determine that the benign feature frequency falls within the benign threshold range. In some implementations, the system can set the second coordinate of the first reuse vector to a match value responsive to the determination that the benign feature frequency falls within the benign threshold range.

In some implementations, the system can scan the training binary to identify a number of occurrences of the first feature. In some implementations, the system can compare the number of occurrences of the second feature to a second feature threshold to determine whether the second feature threshold is satisfied. In some implementations, the system can scan the training binary to identify a number of occurrences of the second feature. In some implementations, the system can compare the number of occurrences of the first feature to a first feature threshold to determine whether the first feature threshold is satisfied. In some implementations, the system can determine that the training binary includes the first feature and the second feature responsive to the first feature threshold being satisfied and the second feature threshold being satisfied.

In some implementations, the first reuse vector is a bit string comprising a first half and a second half, the first half comprising a first plurality of bits and the second half comprising a second plurality of bits, and the system can determine that the malicious feature frequency falls within the malicious threshold range. In some implementations, the system can set a first bit of the first plurality of bits to a binary one and a second bit of the first plurality of bits to a binary zero responsive to the determination that the malicious feature frequency falls within the malicious threshold range. In some implementations, the system can determine that the benign feature frequency falls within the benign threshold range. In some implementations, the system can set a first bit of the second plurality of bits to a binary one and a second bit of the second plurality of bits to a binary zero responsive to the determination that the benign feature frequency falls within the benign threshold range.

In some implementations, the system can concatenate the first half with the second half to generate the first reuse vector. In some implementations, the system can determine a minimum value of the reuse tensor and a maximum value of the reuse tensor. In some implementations, the system can normalize the reuse tensor using the minimum value and the maximum value to create a normalized reuse tensor. In some implementations, the system can train the malware classification model using the normalized reuse tensor and the known classification associated with the first binary.

In some implementations, the malware classification model is a first malware classification model associated with a first feature type, and the first feature and the second feature are each associated with the first feature type, and the system can determine that the training binary includes a third feature and a fourth feature, wherein the third feature is associated with a third reuse vector and a third weight value corresponding to the size of the third feature, and the fourth feature is associated with a fourth reuse vector and a fourth weight value corresponding to the size of the fourth feature, the third feature and the fourth feature associated with a second feature type. In some implementations, the system can construct, responsive to the determination that the first binary includes the third feature and the fourth feature, a second reuse tensor using the third reuse vector, the fourth reuse vector, the third weight value, and the fourth weight value. In some implementations, the system can train a second malware classification model using the second reuse tensor, the second malware classification model used to classify binaries based on an input tensor, the first malware classification model, and a voting system.

In some implementations, the system can parse the training binary to identify a first code block, the first code block comprising a first plurality of computer executable instructions. In some implementations, the system can hash the first plurality of computer readable instructions to generate a first hashed code block. In some implementations, the system can parse the training binary to identify a second code block, the second code block comprising a second plurality of computer executable instructions. In some implementations, the system can hash the second plurality of computer readable instructions to generate a second hashed code block. In some implementations, the system can access the database using the first hashed code block and the second hashed code block to determine that the training binary includes the first feature and the second feature.

In some implementations, the system can parse the training binary to identify a first API call, the first API call comprising a first function name. In some implementations, the system can hash the first function name to generate a first hashed API call. In some implementations, the system can parse the training binary to identify a second API call, the second API call comprising a second function name. In some implementations, the system can hash the second function name to generate a second hashed API call. In some implementations, the system can access the database using the first hashed API call and the second hashed API call to determine that the training binary includes the first feature and the second feature. In some implementations, the system can parse the training binary to identify a first string, the first string comprising a first plurality of characters. In some implementations, the system can parse the training binary to identify a second string, the second string comprising a second plurality of characters. In some implementations, the system can access the database using the first string and the second string to determine that the training binary includes the first feature and the second feature.

At least one other aspect of this technical solution is directed to a method of classifying malware based on the frequency of feature reuse. The method can be performed, for example, by a data processing system comprising one or more processors and a memory. The method can include identifying, from a database: (1) a malicious feature frequency corresponding to a number of occurrences of a first feature in a plurality of known malicious binaries, (2) a benign feature frequency corresponding to a number of occurrences of the first feature in a plurality of known benign binaries, and (3) a first weight value of the first feature corresponding to the size of the first feature. The method can include generating a first reuse vector based on the malicious feature frequency and the benign feature frequency, the first reuse vector having a first coordinate corresponding to a malicious threshold range and a second coordinate corresponding to a benign threshold range. The method can include determining that a training binary associated with a known classification includes the first feature and a second feature, wherein the second feature is associated with a second reuse vector and a second weight value corresponding to the size of the second feature. The method can include constructing, responsive to determining that the first binary includes the first feature and the second feature, a reuse tensor using the first reuse vector, the second reuse vector, the first weight value, and the second weight value. The method can include training a malware classification model using the reuse tensor and the known classification associated with the training binary.

In some implementations, the method can include determining that the malicious feature frequency falls within the malicious threshold range. In some implementations, the method can include setting the first coordinate of the first reuse vector to a match value responsive to the determination that the malicious feature frequency falls within the malicious threshold range. In some implementations, the method can include determining that the benign feature frequency falls within the benign threshold range. In some implementations, the method can include setting the second coordinate of the first reuse vector to a match value responsive to the determination that the benign feature frequency falls within the benign threshold range.

In some implementations, the method can include scanning the training binary to identify a number of occurrences of the first feature. In some implementations, the method can include comparing the number of occurrences of the second feature to a second feature threshold to determine whether the second feature threshold is satisfied. In some implementations, the method can include scanning the training binary to identify a number of occurrences of the second feature. In some implementations, the method can include comparing the number of occurrences of the first feature to a first feature threshold to determine whether the first feature threshold is satisfied. In some implementations, the method can include determining that the training binary includes the first feature and the second feature responsive to the first feature threshold being satisfied and the second feature threshold being satisfied.

In some implementations, the first reuse vector is a bit string comprising a first half and a second half, the first half comprising a first plurality of bits and the second half comprising a second plurality of bits, and the method can include determining, by the data processing system, that the malicious feature frequency falls within the malicious threshold range. In some implementations, the method can include setting a first bit of the first plurality of bits to a binary one and a second bit of the first plurality of bits to a binary zero responsive to the determination that the malicious feature frequency falls within the malicious threshold range. In some implementations, the method can include determining that the benign feature frequency falls within the benign threshold range. In some implementations, the method can include setting a first bit of the second plurality of bits to a binary one and a second bit of the second plurality of bits to a binary zero responsive to the determination that the benign feature frequency falls within the benign threshold range.

In some implementations, the method can include concatenating the first half with the second half to generate the first reuse vector. In some implementations, the method can include determining a minimum value of the reuse tensor and a maximum value of the reuse tensor. In some implementations, the method can include normalizing the reuse tensor using the minimum value and the maximum value to create a normalized reuse tensor. In some implementations, the method can include training the malware classification model using the normalized reuse tensor and the known classification associated with the first binary. In some implementations, the malware classification model is a first malware classification model associated with a first feature type, and the first feature and the second feature are each associated with the first feature type, and the method can include determining that the training binary includes a third feature and a fourth feature, wherein the third feature is associated with a third reuse vector and a third weight value corresponding to the size of the third feature, and the fourth feature is associated with a fourth reuse vector and a fourth weight value corresponding to the size of the fourth feature, the third feature and the fourth feature associated with a second feature type. In some implementations, the method can include constructing, responsive to the determination that the first binary includes the third feature and the fourth feature, a second reuse tensor using the third reuse vector, the fourth reuse vector, the third weight value, and the fourth weight value. In some implementations, the method can include training a second malware classification model using the second reuse tensor, the second malware classification model used to classify binaries based on an input tensor, the first malware classification model, and a voting system.

In some implementations, the method can include parsing the training binary to identify a first code block, the first code block comprising a first plurality of computer executable instructions. In some implementations, the method can include hashing the first plurality of computer readable instructions to generate a first hashed code block. In some implementations, the method can include parsing the training binary to identify a second code block, the second code block comprising a second plurality of computer executable instructions. In some implementations, the method can include hashing the second plurality of computer readable instructions to generate a second hashed code block. In some implementations, the method can include accessing the database using the first hashed code block and the second hashed code block to determine that the training binary includes the first feature and the second feature.

In some implementations, the method can include parsing the training binary to identify a first API call, the first API call comprising a first function name. In some implementations, the method can include hashing the first function name to generate a first hashed API call. In some implementations, the method can include parsing the training binary to identify a second API call, the second API call comprising a second function name. In some implementations, the method can include hashing the second function name to generate a second hashed API call. In some implementations, the method can include accessing the database using the first hashed API call and the second hashed API call to determine that the training binary includes the first feature and the second feature. In some implementations, the method can include parsing the training binary to identify a first string, the first string comprising a first plurality of characters. In some implementations, the method can include parsing the training binary to identify a second string, the second string comprising a second plurality of characters. In some implementations, the method can include accessing the database using the first string and the second string to determine that the training binary includes the first feature and the second feature.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. These and other aspects and features of the present technical solution will become apparent to those ordinarily skilled in the art upon review of the following description in conjunction with the accompanying figures, wherein.

DETAILED DESCRIPTION

Below are detailed descriptions of various concepts related to, and implementations of, methods, apparatuses, and systems of classifying malware based on the frequency of feature reuse. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
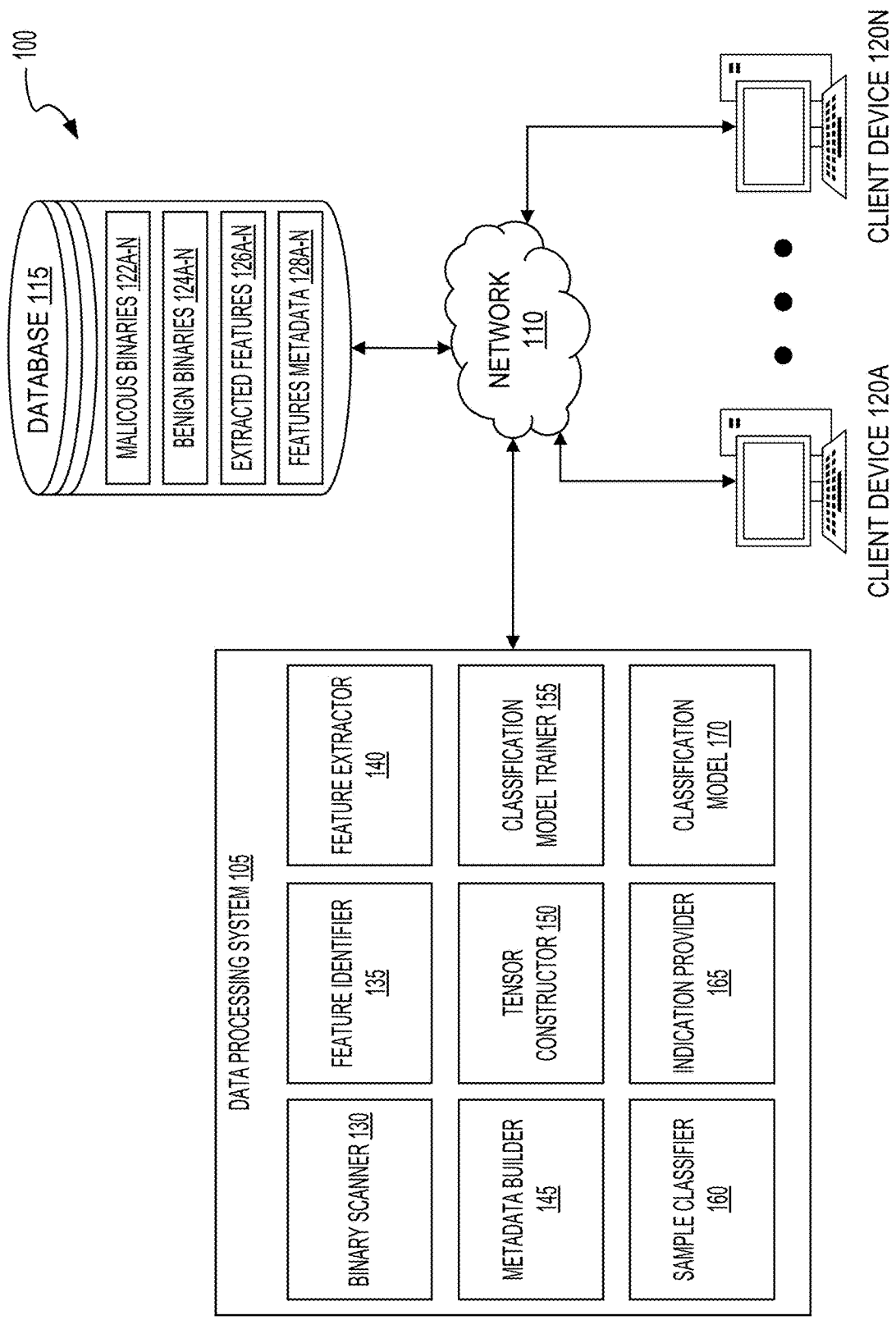
FIG. 1 is a block diagram illustrating an implementation of a system for classifying malware based on the frequency of feature reuse.

Referring now to FIG. 1, illustrated is a block diagram of an system 100 for classifying malware based on the frequency of feature reuse. The system 100 can include at least one data processing system 105, at least one computer network 110, and at least one client device 120A-N (sometimes generally referred to as client device 120), and at least one database 115. The data processing system 105 can include at least one binary scanner 130, at least one feature identifier 135, at least one feature extractor 140, at least one metadata builder 145, at least one tensor constructor 150, at least one classification model trainer 155, at least one sample classifier 160, at least one indication provider 165, and at least one classification model 170. The database 115 can include at least one malicious binaries 122A-N (sometimes generally referred to as malicious binaries 122), at least one benign binaries 124A-N (sometimes generally referred to as benign binaries 124), at least one extracted features 126A-N (sometimes generally referred to as extracted features 126), and at least one features metadata 128A-N (sometimes generally referred to as features metadata 128).

Figure 8:
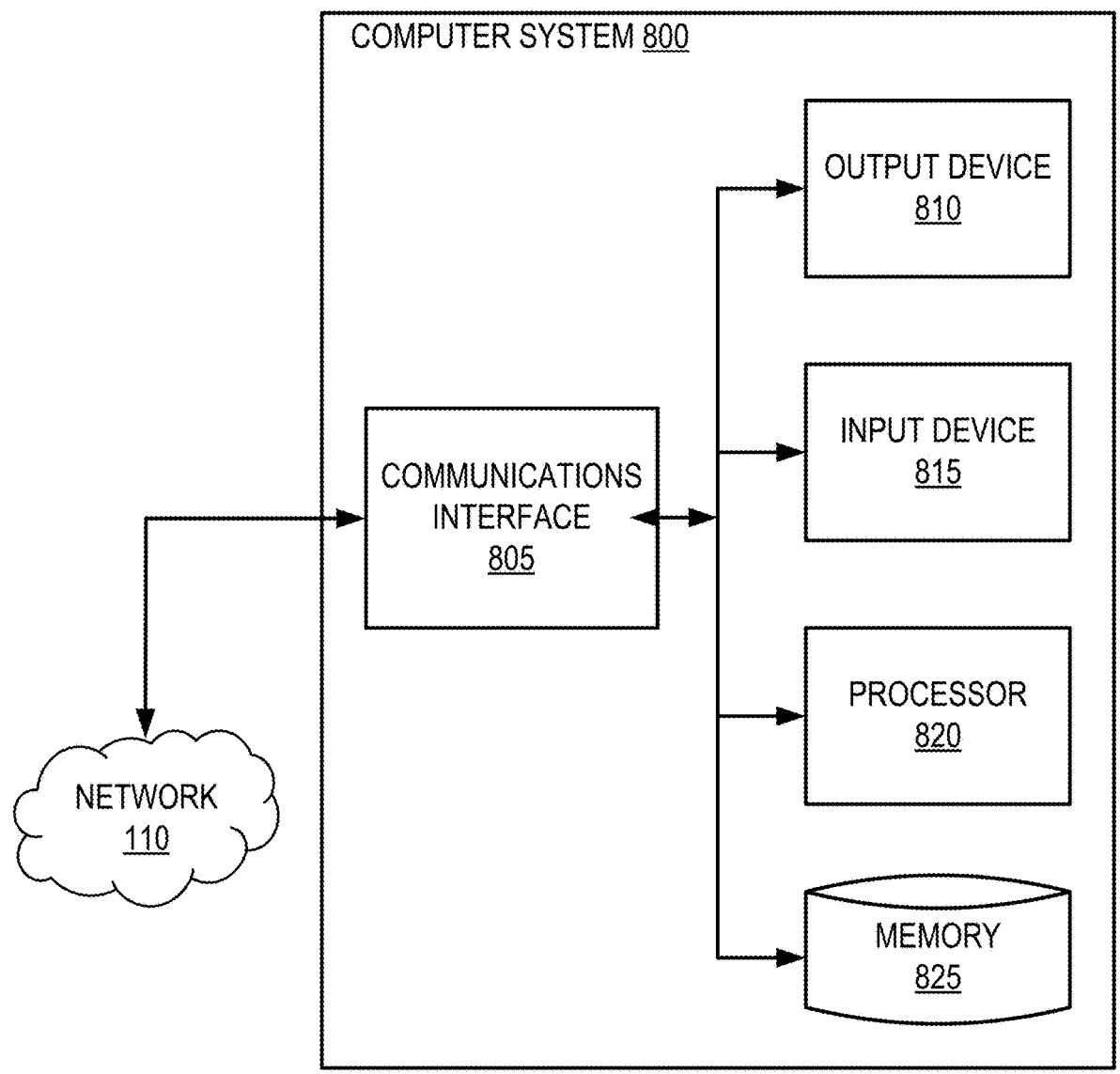
FIG. 8 shows the general architecture of an illustrative computer system that may be employed to implement any of the computers discussed herein.

Each of the components (e.g., the data processing system 105, the network 110, the database 115, the client devices 120, the binary scanner 130, the feature identifier 135, the feature extractor 140, the metadata builder 145, the tensor constructor 150, the classification model trainer 155, the sample classifier 160, the indication provider 165, the classification model 170, the malicious binaries 122, the benign binaries 124, the extracted features 126, and the features metadata 128) of the system 100 can be implemented using the hardware components or a combination of software with the hardware components of a computing system 800 detailed herein in conjunction with FIG. 8. For example, the data processing system 105 can include servers or other computing devices. The client devices 120 can include servers or other computing devices. Each of the components of the data processing system 105 can perform the functionalities detailed herein.

The network 110 can include computer networks such as the Internet, local, wide, metro or other area networks, intranets, satellite networks, other computer networks such as voice or data mobile phone communication networks, and combinations thereof. The data processing system 105 of the system 100 can communicate via the network 110, for instance with at least one content provider 115 and at least one database 120. The network 110 may be any form of computer network that relays information between the content provider 115, data processing system 105, and one or more content sources, such as web servers, amongst others. In some implementations, the network 110 may include the Internet and/or other types of data networks, such as a local area network (LAN), a wide area network (WAN), a cellular network, a satellite network, or other types of data networks. The network 110 may also include any number of computing devices (e.g., computers, servers, routers, network switches, etc.) that are configured to receive and/or transmit data within the network 110. The network 110 may further include any number of hardwired and/or wireless connections. The content provider 115 may communicate wirelessly (e.g., via WiFi, cellular, radio, etc.) with a transceiver that is hardwired (e.g., via a fiber optic cable, a CAT5 cable, etc.) to other computing devices in the network 110. The content provider 115 may also communicate wirelessly with the computing devices of the network 110 via a proxy device (e.g., a router, network switch, or gateway).

The data processing system 105 can include at least one processor and a memory, i.e., a processing circuit. The memory stores processor-executable instructions that, when executed by processor, cause the processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language. The data processing system 105 can include one or more computing devices or servers that can perform various functions, including, for example, the functionalities or methods described herein.

The database 115 can be a database configured to store and/or maintain any of the information described herein. The database 120 can maintain one or more data structures which can contain or index each of the values, pluralities, or thresholds described herein. The database 115 can be accessed using one or more memory addresses or index values. The database 115 can be accessed by the components of the data processing system 105, or the client devices 120 via the network 110. In some implementations, the database 115 can be internal to the data processing system 105. In some implementations, the database 115 can exist external to the data processing system 105, and may be accessed via the network 110. The database 115 can be distributed across many different computer systems or storage elements, and may be accessed via the network 110 or a suitable computer bus interface. The data processing system 105 can store, in the database 115, the results of any or all computations, determinations, selections, identifications, generations, constructions, or calculations in one or more data structures indexed with appropriate values, each of which may be accessed by the data processing system 105 or the client devices 120 to perform any of the functionalities or functions described herein.

The malicious binaries 122 can include binaries that, when executed by a computing device, perform undesirable or otherwise malicious activity. The malicious binaries 122 can include one or more code segments, strings, hash values, function calls, API function calls, or other features that are associated with malicious activity. Such features may be generally referred to as malicious features. The malicious binaries 122 can include benign features, which can correspond to code segments, strings, hash values, function calls, API function calls, or other features that are not associated with malicious behavior. Malicious behavior can include modifying protected operating system files, transmitting protected or private information to a third party, accessing input (e.g., keyboard, mouse, touch, or other interaction events, etc.), logging operating system behavior, downloading or installing software, executing unauthorized code, logging or otherwise obtaining protected or private information (e.g., passwords, credit card information, identity information, or other private information, etc.), among others. The malicious binaries 122 can include one or more identifiers that identify or classify the binaries as malicious. Although the malicious binaries 122 appear to be resident in the database 115, in some implementations the malicious binaries 122 can be resident in any other region of computer memory in the system 100, such as in a data structure in the memory of the data processing system 105. In some implementations, the malicious binaries 122 can be retrieved, gathered, catalogued, or otherwise obtained from one or more client devices 120.

The benign binaries 124 can include binaries that, when executed by a computing device, perform desirable or otherwise normal computing activity. For example, the benign binaries 124 can include one or more benign features such as code segments, strings, hash values, function calls, API function calls, or other features that are associated with operating system functions, or normally installed programs or software. Such features may be generally referred to as benign features. The benign binaries 124 may include malicious features, which can correspond to code segments, strings, hash values, function calls, API function calls, or other features that may be associated with malicious behavior. However, although the benign binaries 124 can include features that are common to the malicious binaries 122, the benign binaries 124 can be known to not perform malicious or undesirable activities or functions. The benign binaries 124 can include one or more identifiers that identify or classify the benign binaries 124 as benign. Although the benign binaries 124 appear to be resident in the database 115, in some implementations the benign binaries 124 can be resident in any other region of computer memory in the system 100, such as in a data structure in the memory of the data processing system 105. In some implementations, the benign binaries 124 can be retrieved, gathered, catalogued, or otherwise obtained from one or more client devices 120.

The extracted features 126 can include features extracted from the malicious binaries 122 or the benign binaries 124. The extracted features 126 can be identified, for example, by the feature identifier 135 of the data processing system 105, and extracted by the feature extractor 140 of the data processing system 105. For example, the feature identifier 135 can scan the malicious binaries 122 or the benign binaries 124, and identify one or more code segments, strings, hash values, function calls, API function calls, or other features. Each feature, once identified, can be associated with a corresponding classification of the binary from which it was identified. For example, if the extracted feature 126 was identified from a binary associated with a known malicious classification (e.g., a malicious binary 122, etc.), the respective extracted feature 126 can be associated with a malicious classification. If the extracted feature 126 was identified from a binary associated with a known benign classification (e.g., a benign binary 124, etc.), the respective extracted feature 126 can be associated with a benign classification. If the extracted feature 126 was identified from a binary associated with any other type of classification, the respective extracted feature 126 can be associated with that other type of classification. Although the extracted features 126 appear to be resident in the database 115, in some implementations the extracted features 126 can be resident in any other region of computer memory in the system 100, such as in a data structure in the memory of the data processing system 105.

The features metadata 128 can include information about the extracted features 126. For example, when the extracted features 126 are extracted by the feature extractor 140, the feature extractor 140 and the metadata builder 145 can update an entry corresponding to the respective extracted feature 126 in the features metadata 128. The memory location in the features metadata 128 can be obtained, for example, by taking a hash value of the respective feature. The hash value can be obtained using a hash function designed to generate a memory location in the database 115 or the memory of the data processing system 105 that points to the respective feature metadata 128 entry. The features metadata 128 can include entries for each of the extracted features 126. Each entry in the features metadata 128 can include, for example, the total number of occurrences of the respective feature in malicious binaries 122, the total number of occurrences of the respective feature in benign binaries 124, the size of the respective feature (e.g., in bytes, bits, amount of storage allocated at runtime, number of op-codes, JUMP or CALL instruction distance, type of opcode, etc.), the type of the respective feature (e.g., code segment, hashed code segment, string, hashed string, a collection of bytes, a hashed collection of bytes, function calls, hashed function calls, API calls, hashed API calls, files, hashed files, collection of binary data, hashed collection of binary data, etc.). Each of the features metadata can be accessed, for example, by any of the modules, components, or computing devices of the data processing system 105.

The client device 120 can be a computing device configured to communicate via the network 110 to display data such as an indication provided by the data processing system 105 (e.g., an indication providing that a particular sample is malicious or benign, etc.). The client device 120 can be a desktop computers, laptop computers, tablet computers, smartphones, personal digital assistants, mobile devices, consumer computing devices, servers, clients, digital video recorders, a set-top box for a television, a video game console, or any other computing device configured to communicate via the network 110, among others. The client device 120 can transmit or receive one or more samples to the data processing system 105 for subsequent analysis. The transmission can be accompanied by a request for analysis by the data processing system 105, for example a request to classify one or more samples.

The client device 120 can include a processor and a memory, i.e., a processing circuit. The memory stores machine instructions that, when executed by processor, cause processor to perform one or more of the operations described herein. The processor may include a microprocessor, an application-specific integrated circuit (ASIC), a field-programmable gate array (FPGA), etc., or combinations thereof. The memory may include, but is not limited to, electronic, optical, magnetic, or any other storage or transmission device capable of providing the processor with program instructions. The memory may further include a floppy disk, CD-ROM, DVD, magnetic disk, memory chip, ASIC, FPGA, read-only memory (ROM), random-access memory (RAM), electrically erasable programmable ROM (EEPROM), erasable programmable ROM (EPROM), flash memory, optical media, or any other suitable memory from which the processor can read instructions. The instructions may include code from any suitable computer programming language.

The client device 120 can include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of the client device 120 (e.g., a built-in display, microphone, etc.) or external to the housing of the client device 120 (e.g., a monitor connected to the client device 120, a speaker connected to the client device 120, etc.). In some implementations, the client device 120 may include an electronic display, which visually displays interfaces using interface data provided by an operating system executing on the client device 120, retrieved from the database 115, or provided by the data processing system 105.

The binary scanner 130 the malicious binaries 122 and the benign binaries 124 from the database 115, a region of computer memory in the data processing system 105, or the client devices 120. The binary scanner 130 can scan each of the malicious binaries 122 and the benign binaries 124 by parsing, scanning, or otherwise examining the binary data in each of the binaries. Identifying the binaries can include accessing one or more data structures in the database to access a list of each of the malicious and benign binaries, code samples, or other type of identifiable sample. Accessing the database can include transmitting one or more requests for a list of samples to the database, and receiving a response from the database. The response can include a list of samples (e.g. binaries, computer code, computer data, etc.), and a list of associations indicating a classification for each sample in the list of samples. In some implementations, the binary scanner 130 can identify the list of known samples from the memory of the data processing system without accessing the database. For example, the binary scanner 130 can update the database using binaries or samples that are local to the data processing system 105, or received from an external computing device (e.g., one or more of the client devices 120, etc.) via the network 110. The binary scanner 130 can scan each of the identified binaries to build the set of extracted features 126 and the features metadata 128, as well as extract features from unknown binary samples for classification. The output of the binary scanner 130 can be passed to the feature identifier 135 to identify one or more features of the malicious binaries 122, benign binaries 124, or unclassified binaries. In some implementations, the binary scanner 130 can receive a request via the network 110 to scan an unclassified binary. The request can include the unclassified binary, and metadata associated with the unclassified binary, such as size information (e.g., size in bytes, size in bits, etc.), date and time of binary creation, date and time of last binary execution or access, among others.

The feature identifier 135 can receive the output of the binary scanner 130, which can include binary data, and information associated with a respective binary or sample, such as name, classification (e.g., if known malicious, benign, or unknown, etc.), size of the binary (e.g., size in bytes, size in bits, etc.). The feature identifier 135 can read the stream of scanned data from the binary scanner 130 to identify features, for example, regions of code (e.g., opcodes in a block of code termination by a CALL, JUMP, or conditional break instruction, etc.), strings, numbers, data, metadata (e.g., time of creation, time of access, time of modification, etc.), function calls (e.g., JUMP instructions, CALL instructions, operating system break points or interrupts, etc.), among other features present in binary executables or binary data. Such features can include binary header information that correspond to a particular file format, data arrangement in the binary file, and other information. Each of the features identified by the feature identifier can correspond to a region of binary data in the respective scanned binary. The feature identifier 135 can identify the start location (e.g., binary starting location, etc.), end location (e.g., binary end location, etc.), and size (e.g., size of the respective feature in bytes, size of the respective feature in bits, size of allocated memory for feature at runtime, etc.), and other information for each feature identified in the information received form the binary scanner 130. The feature identifier 135 can provide the locations, sizes, and feature data, and binary or sample data to the feature extractor 140 for further processing.

The feature extractor 140 can extract the features identified by the feature identifier 135 and store them as the extracted features 126 along with corresponding entries in the feature metadata 128 in the database 115. For example, the feature extractor 140 can identify and extract the binary data starting at the feature start location and ending at the feature end location received from the feature identifier 135. In some implementations, the feature extractor 140 can hash one or more of the features identified by the feature identifier 135. The feature extractor can use one or more hash functions (e.g., SHA-1, SHA-2, MD5, etc.) to hash the binary data corresponding to the locations and size as received from the feature identifier 135. The feature extractor 140 can update the extracted features or extracted hashed features in the database 115 by updating the extracted features 126 to include the features extracted from binaries or samples. In addition to updating the features in the database 115, the feature extractor can provide the feature, the hashed feature, the sample metadata, and the locations and feature size received from the feature identifier 145 to the metadata builder 145. In some implementations, under certain circumstances (e.g., the sample or binary is yet unclassified, etc.), the feature extractor 140 will forego updating the extracted features 126 in the database 115, and instead provide the extracted features to the metadata builder 145 for further processing.

The metadata builder 145 can receive the features and their associated metadata, along with any metadata associated with the respective binary or sample, from the feature extractor 140. The metadata builder 145 can track, in one or more counter registers or variables, the total number of each respective feature for each identified classification. For example, if there are two known identified classifications (e.g., benign and malicious, etc.), the metadata builder 145 can maintain two counter registers for each unique feature extracted from binaries or samples by the feature extractor 140, one counter register corresponding to the number of occurrences of the feature in benign binaries or samples, and one counter register corresponding to the number of occurrences of the feature in malicious binaries or samples. If the metadata builder 145 is building metadata for a binary or sample that is yet unclassified by the system, the metadata builder can maintain a single counter register for each unique feature extracted by the feature extractor 140. If a new feature (e.g., not yet associated with a counter register, etc.), is detected by the metadata builder 145, the metadata builder 145 can instantiate (e.g., allocate memory for, etc.) a counter register, and associate the new counter register with an identifier that corresponds to the respective extracted feature. The metadata builder 145 can maintain, for each feature and classification type, among other things: the total number of occurrences of the respective feature in malicious binaries 122, the total number of occurrences of the respective feature in benign binaries 124, the size of the respective feature (e.g., in bytes, bits, amount of storage allocated at runtime, number of op-codes, JUMP or CALL instruction distance, type of opcode, etc.), the type of the respective feature (e.g., code segment, hashed code segment, string, hashed string, a collection of bytes, a hashed collection of bytes, function calls, hashed function calls, API calls, hashed API calls, files, hashed files, collection of binary data, hashed collection of binary data, etc.).

In addition, the metadata builder 145 can maintain and identify, from a database, the malicious feature frequency of any particular feature, the benign feature frequency of any feature, and the size (e.g., size in bytes, size in bits, size allocated for the feature at runtime, etc.) of any particular feature. Each of these values can be maintained and determined by the metadata builder 145 by counting or incrementing each of the counter registers corresponding to the respective value. For example, the malicious feature frequency can be obtained by counting the total number of occurrences of a particular feature in known malicious binaries or samples, and the benign feature frequency can be obtained by counting the total number of occurrences of a particular feature in known benign binaries or samples. The metadata builder 145 can maintain, update, and store the benign feature frequency, the malicious feature frequency, and the size of a feature in the features metadata 128. The metadata builder 145 can update the features metadata 128, for example, each time features are extracted from a binary or sample. An exemplary depiction of the extraction and determination of features and metadata are shown in FIG. 2.

Figure 2:
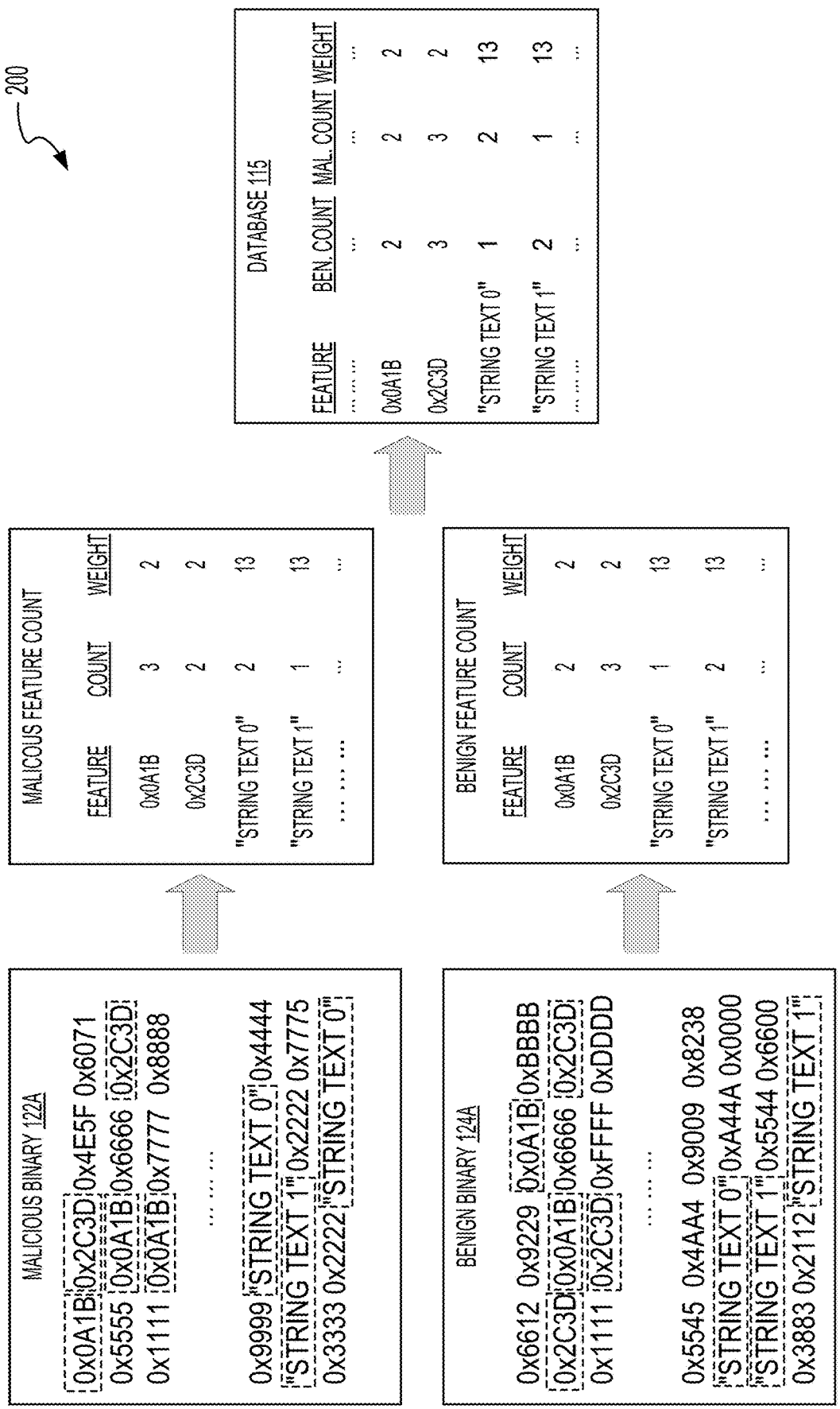
FIG. 2 is an example schematic diagram illustrating the identification of features in samples, and the translation of those features into database entries.

Referring now to FIG. 2, illustrated is example schematic diagram 200 illustrating the identification of features in samples, and the translation of those features into database entries. In the schematic diagram 200, there are two binaries: the malicious binary 122A, and the benign binary 124A. As indicate by the hashed boxes, the feature identifier and the feature extractor can identify and extract binary and string features, among others, from each of the binaries. Note that, although binaries with known classification are depicted in the schematic 200, it should be understood that the data processing system 105 and its components can process and extract features and metadata from binaries or samples that are yet unclassified. The metadata builder can maintain a list of features and associated metadata for each binary, as indicated in the malicious feature count box and the benign feature count box. As depicted in the malicious feature count box, there are a list of features, a number of occurrences of those features in the respective binary (e.g., malicious binary 122A), and a weight value associated with each feature.

The weight value, as depicted in FIG. 2, represents the size of the feature in bytes. For example, each of the features "0x0A1B" and "0x02C3D" each comprise two bytes of binary data, and thus they are associated with a weight value of "2". Likewise, the string values "STRING TEXT 0" and "STRING TEXT 1", if interpreted as ASCII strings, each include at least 13 bytes, or 14 bytes if including the NULL termination (e.g., a byte equal to "0x00" or another string termination character or indicator, etc.). Because the terminator character is common to each string, it is excluded from the size value in FIG. 2, however it should be understood that in some implementations, it may be included in the size of the feature. In such implementations, the weight value for each string would be equal to 14 if the string terminator character is equal to one byte in size. Likewise, there is a respective benign feature count that identifies the same values for the features identified in the benign binary 124A. Although the features identified in the benign binary 124A are the same as those identified in the malicious binary 122A, it should be understood that any feature can be identified independent of those identified in the malicious binary 122A, and that the same features were shown to be identified in the benign binary 124A for the sake of brevity.

Further illustrated in schematic 200 are the contents the database 115, namely the extracted features 126 and the features metadata 128. For example, the features metadata includes the number of occurrences of a particular feature in benign binaries (e.g., indicated under BEN. COUNT), the number of occurrences of a particular feature in malicious binaries (e.g., indicated under MAL. COUNT), and weight value associated with each feature (e.g., the size of the feature in bytes, bits, or size in bytes allocated at runtime, etc.). Also indicated as included in the database 115 are the features themselves. Although database 115 is indicated in the schematic 200 as including the features in their entirety, it should be understood that the database 115 may instead contain hashed values of each feature to reduce the amount of storage required to maintain the features, or some combination thereof. Each of the components of the data processing system can iterate over and scan each of the binaries with known classifications to build a knowledge base (e.g., the extracted features 126 and the features metadata 128, etc.) that includes the known occurrences of each feature in malicious and benign binary samples, and the associated feature size. The information in the knowledge base (e.g., the extracted features 126 and the features metadata 128, etc.) can be used to generate tensors for each known binary sample to train a classification model for binary samples.

Referring back to FIG. 1, after building the knowledge base (e.g., the extracted features 126 and the features metadata 128, etc.) the tensor constructor 150 can iterate through each binary or sample with a known classification, and generate reuse vectors for each feature identified in the selected binary. To do so, the tensor constructor 150 can use the binary scanner 130 and the feature identifier 135 to identify features in the selected binary samples. After identifying the features, the tensor constructor 150 can access the database 115 to identify the reuse frequency of each feature, and the weight value associated with each feature. Identifying the reuse frequency of a particular feature can include querying the database 115 to request the total number of occurrences of the feature in question for some or all potential classifications. For example, a database query, or request, could include a request for the number of occurrences of the selected feature as they have occurred in samples that are classified as benign. In response to this request, the database 115 can return one or more values indicating the values in the request, which in this example is the number of occurrences of the selected feature in samples classified as benign. In some implementations, the request can include more than one classification type. In such implementations, the database 115 can return one or more data structures in one or more messages indicating the number of occurrences of the feature included as identified in samples that correspond to each classification identified in the request. For example, a request can include a feature, and a request for the number of occurrences of the feature in malicious samples and the number of occurrences of the feature in benign samples. Furthering this example, the tensor constructor 150 can return a message indicating that the feature has been observed in 504 benign samples and 2020 malicious samples. These values, while illustrative of a possible outcome of a request, should be understood as exemplary only and should not be construed as a required output of the database or any other component of the system. Further, although this example includes only two types of classifications (e.g., malicious and benign), it should be understood that a request, and the corresponding response, can include any number of classification types described herein or otherwise. Each response value received from the database associated with a particular classification can be the reuse frequency of the selected sample with respect to a particular classification.

Using the reuse frequency that was gathered from the database in (STEP 612), the tensor constructor 150 can generate a reuse pattern that is representative of the sample and its reuse values. To generate the reuse pattern, the data processing system can create a bit string for each possible classification type (e.g., associated with the sample or the classification model to be trained. Each position in each bit string can represent one or more frequency reuse ranges, or buckets. The ranges can be indicative of a particular range of values for each reuse value. An exemplary depiction of the generation of reuse patterns for particular features are presented in FIG. 3.

Figure 3:
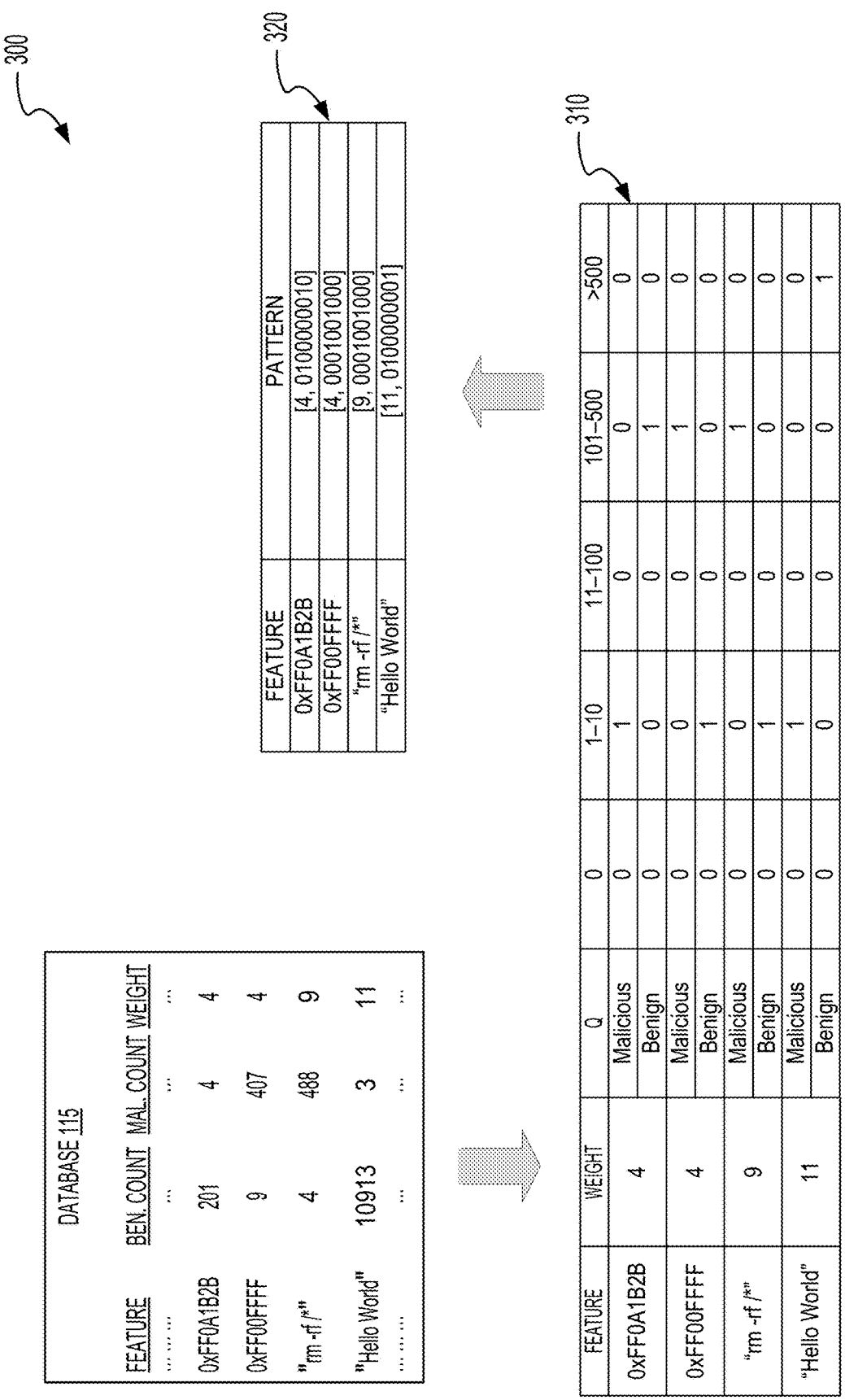
FIG. 3 is an example schematic diagram illustrating the translation of features identified from database entries into corresponding reuse patterns.

Referring now to FIG. 3, illustrated is an example schematic diagram 300 illustrating the translation of features identified from database entries into corresponding reuse patterns. As depicted in schematic diagram 300, the database 115 includes various features, feature frequencies (e.g., the number of occurrences of each feature in benign samples, the number of occurrences of each feature in malicious samples, etc.), and a weight value associated with each feature. The tensor constructor 150 can access each of the entries in the database 115 that correspond to the features identified in a selected binary. Using the benign and malicious frequency values of each feature, the tensor constructor can generate a bit string for the number of benign occurrences of each feature and the number of malicious occurrences of each feature, as illustrated in the table 310 in schematic 300. Although the table 310 is depicted as though it represented a single data structure, it should be understood that each bit string may be organized in its own data structure. As such, the table 310 is merely organized for the sake of clarity, and should not be interpreted as narrowing the scope of the arrangement of data in memory of the data processing system 105, its components, or the database 115.

As shown in table 310, each feature is associated with at least two bit strings: one bit string corresponding to the malicious feature frequency, and another bit string corresponding to the benign feature frequency. Each bit string can be a one-hot bit string, where each position corresponds to a range of potential frequency values. In this example, illustrative implementation, the frequency values are, from least to greatest, 0, 1-10, 11-100, 101-500, and greater than 2000. Although only 5 possible bit positions are illustrated, it should be understood that any implementation can exist with any number of bit positions that correspond to any range of frequency values. The positions illustrated in table 310 are merely exemplary values and should not be interpreted as limiting the scope of any implementation described herein. The tensor constructor 150 can set each position corresponding to the frequency value of the respective feature to a value of 1, and all other positions in the bit string to zero. For example, the feature "0xFF0A1B2B" occurs 201 times in benign samples, and 4 times in malicious samples. As such, the tensor constructor 150 can set the bit string for malicious frequency to 01000, and the bit string for benign frequency to 00010.

After generating the bit strings that correspond to each feature and classification frequency, the tensor constructor can concatenate each of the bit strings to create a reuse vector. Furthering the example above, the tensor constructor 150 can concatenate the malicious feature frequency bit string 01000 and the benign feature frequency bit string of 00010 to create the reuse vector of 0100000010 associated with the "0xFF0A1B2B" feature. After concatenating the bit strings, the tensor constructor can generate a reuse vector tuple that can include both the reuse vector for a feature, and the weight value associated with that feature. The final reuse vector tuple for each feature identified in the schematic 300 are included in the table 320. Although the reuse vector tuple is illustrated as only including the reuse vector and the weight value associated with each feature in a particular order, it should be understood that the reuse vector tuple can include any particular order of data, and may also include additional metadata or feature information. After generating the reuse vector tuple for each feature identified in a vector, the tensor constructor can store the reuse vector tuples in one or more data structures in the memory of the data processing system 105.

Referring back to FIG. 1, to construct a reuse tensor from the reuse vectors associated with each feature identified in from a binary or sample, the tensor constructor 150 can determine that a binary includes one or more features associated with a respective stored reuse vector. For example, the tensor constructor may iterate through each feature in the extracted features 126 and generate reuse vector tuples for each feature in a pre-processing step. This way, the tensor constructor need not generate the reuse vectors that are common to more than one binary more than one time, which is a technical improvement to feature identification systems because it reduces the amount of computational resources required to determine reuse tensors for each binary or sample. Upon determining that features associated with generated reuse vectors are present in a binary or sample, the tensor constructor 150 can generate reuse tensor corresponding to the features identified from the respective binary or sample.

The rows of the reuse tensor can each correspond to a unique value of the generated reuse vectors. For example, if the generated reuse vectors had the same dimensions as defined by the example set forth above with respect to those illustrated in table 320 of FIG. 3, the reuse tensor can have twenty-five rows, each row corresponding to one of the possible reuse vectors. The reuse tensor can include at least three columns, including an overall sum of weights, a count of features, and the average weight value. Because the number of bucket ranges (e.g., bit positions) in each generated reuse vector can be small when compared to the overall number of extracted features, there can be an overlap in the number of features vs the number of rows in the tensor. To represent all of the data associated with each feature, the weights of the features can be aggregated together in the reuse tensor. To aggregate the reuse vectors associated with each feature into the tensor associated with the sample, the sum of weights column can include total sum of the weight values of each feature having the same reuse vector, or pattern of reuse. The generation of an exemplary reuse tensor from features identified in table 320 of FIG. 3 is illustrated in FIG. 4.

Figure 4:
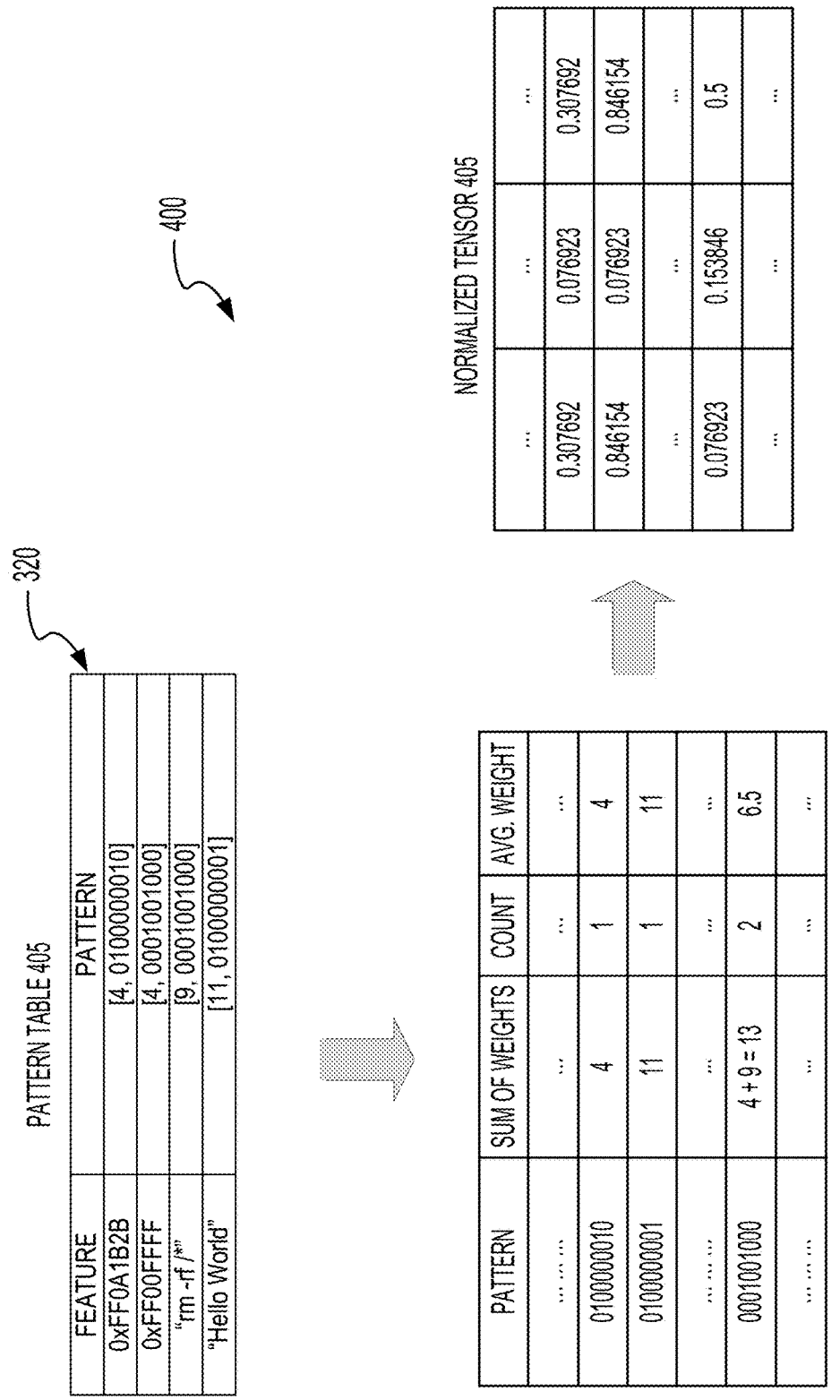
FIG. 4 is an example schematic diagram illustrating the translation from reuse patterns into an aggregated reuse tensor corresponding to a sample.

Referring now to FIG. 4, illustrated is an example schematic diagram 400 illustrating the construction of a reuse tensor from of reuse vectors. Continuing from the reuse vector tuples illustrated in FIG. 3, the tensor constructor can generate a tensor that includes a number of rows that corresponds to the number of possible reuse vector values. For example, if each half of the reuse vector includes 5 bits, the tensor constructor 150 can generate a reuse tensor with 25 rows, because there are 25 possible reuse vectors. The reuse tensor can include at least three columns for each row, the first column indicating the total sum of weights, the second column indicating the total number of features associated with a particular reuse vector, and the average weight associated with the particular reuse vector. This is illustrated in the aggregated tensor 410. Although the aggregated tensor 410 includes only four features, this is merely for the sake of clarity, and should not be interpreted as limiting the scope of any implementation described herein. Accordingly, the reuse tensor (e.g., the aggregated tensor 410) can include any number of rows or columns, as the feature data provides, or as otherwise described herein.

After constructing the reuse tensor using each of the features identified in the binary or sample, the tensor constructor 150 can normalize the values in the reuse tensor. Normalizing the reuse tensor can include, for example, performing one or more calculations on each row or each column of the reuse tensor to align each of the reuse tensor values between two range values, for example zero and one. In some implementations, tensor constructor 150 can normalize the reuse tensor by row. For example, the tensor constructor 150 can determine the largest value in each row, and divide each value in the respective row by the largest value, thereby creating a proportional value that is between zero and one at each position in each row. In some implementations, tensor constructor 150 can normalize the reuse tensor by column. For the tensor constructor 150 can determine the largest value in each column, and divide each value in the respective column by the largest value, thereby creating a proportional value that is between zero and one at each position in each column. In some implementations, the tensor constructor 150 can normalize the reuse tensor in its entirety. For example, the data processing system can determine the largest value in the reuse tensor, and divide each value in the reuse tensor by the largest value, thereby creating a proportional value that is between zero and one at each position in the reuse tensor. In some implementations, the tensor constructor 150 does not normalize the reuse tensor, and instead maintains it as it is. After constructing the reuse tensor, the tensor constructor 150 can store the reuse tensor in association with the binary, and the classification of the binary (e.g., if the binary is a known binary, etc.), in one or more data structures in the memory of the data processing system 105.

Referring back to FIG. 1, the classification model trainer 155 can train the classification model 170 using one or more reuse tensors constructed by the tensor constructor 150 and known classifications associate with the reuse tensor. For example, when constructing the reuse tensor, if the classification of the binary used to construct the reuse tensor is known, the tensor constructor 150 can associate (e.g., store an indication of the association in one or more data structures, etc.) the constructed reuse tensor with the known classification of the corresponding binary. Training the classification model 170 can include, for example, using the values of the constructed reuse tensor as inputs to the classification model 170 and comparing the output of the model to the known classification of the corresponding binary or sample. The output of the model can be a prediction of the classification model or binary. The classification model trainer 155 can adjust any weights, coefficients, or other values in the model based on the difference between the actual classification of the respective binary and the predicted classification of the binary. The classification model trainer 155 may use one or more machine learning processes or algorithms, such as a gradient descent type algorithm, to adjust the weights, coefficients, or other values of the classification model 170. The classification model trainer 155 can be configured to adjust to the weights and coefficients to minimize the difference between the predicted classification of the binary or sample and the actual, known classification of the binary or sample.

The classification model 170 can be a neural network, trained using a gradient descent process. The classification model 170 can include a number of weights and biases, coefficients, or other values to predict the classification of a binary based on input reuse tensor values. The classification model trainer 155 can adjust the weights and biases of the neural network based on the output of the neural network when a reuse tensor is provided as input. The classification model 155 can adjust the weights and biases using a gradient descent, or other type of machine learning algorithm. In some implementations, the classification model 170 can be a linear regression model, a recurrent neural network model, a long-short term memory model, or any other type of machine learning model. In some implementations, the classification model 155 can store the determined reuse vector for later processing, and instead train the model using a batch processing model, where each of the stored reuse tensors associated with each of the identified samples (e.g., binaries) are used to train the classification model in batches, or groups of a predetermined size. The batches of reuse tensors can be determined based on the output received from the classification model.

The sample classifier 160 can utilize the classification model 170 to classify unknown binaries or samples. The sample classifier 160 can receive one or more requests to classify a binary or sample via the network 110 from an external computing device (e.g., a client device 120, another external computing device coupled to the network 110 but not pictured in system 100, etc.). To classify the unknown binary included in the request, the sample classifier can utilize the binary scanner 130, the feature identifier 135, the feature extractor 140, the metadata builder 145, and the tensor constructor 150 to construct a normalized reuse tensor representing the features present in the unknown binary, as described herein above. Classifying the unknown binary can include using the values of the normalized (or non-normalized, as the case may be) reuse tensor as inputs to the trained classification model 170. The classification model 170 can be trained prior to unknown binary classification by the classification model trainer 155. Using the reuse tensor as an input to the classification model 170 can include, for example, applying each value of the reuse tensor an input value to a classification function described by the classification model 170. An output of the classification model 170 can be a predicted classification type of the corresponding unknown or unclassified binary or sample. In some implementations, the classification model 170 can provide a percent confidence value that corresponds to the predicted likelihood of a particular sample or binary being associated with a certain classification type. For example, the classification model 170 may output a value of 0.7 benign and 0.3 malicious, indicating that there is a 70% confidence prediction that the binary is benign, and a 30% confidence prediction that the binary is malicious. In such implementations, the sample classifier 160 can utilize a soft-max function to isolate a single classification type. The sample classifier 160 can provide the predicted classification determined by the classification model 170 to the indication provider 165.

The indication provider 165 can provide an indication of the predicted classification via the network 110. The indication provider 165 can provide the indication, for example, to one or more computing devices that were responsible for the request for the request for classification of the unknown binary. The notification provider 165 can generate one or more notifications, such as emails, SMS messages, push notifications, web browser pages, web browser messages, network pages, JSON messages, or any other type of indication that can be provided to an external computing device. Upon generating the notification, the notification provider 165 can communicate the message via network (e.g., the network 110) to an external computing device that is designated to receive indications related to malicious classifications. In some implementations, the notification provider 165 can include an identifier of the unknown binary in the notification, and can transmit the notification to display the identification of the binary and the classification type on the destination computing device. The notification provider 165 can transmit the notification to a computing device that was responsible for providing a request for classification of the unknown or unclassified binary. The notification provider 165 can store the notification, along with an identifier of the unknown binary and its associated classification, in one or more data structures in the memory of the data processing system 105, or in one or more data structures in the database 115.

Figure 5:
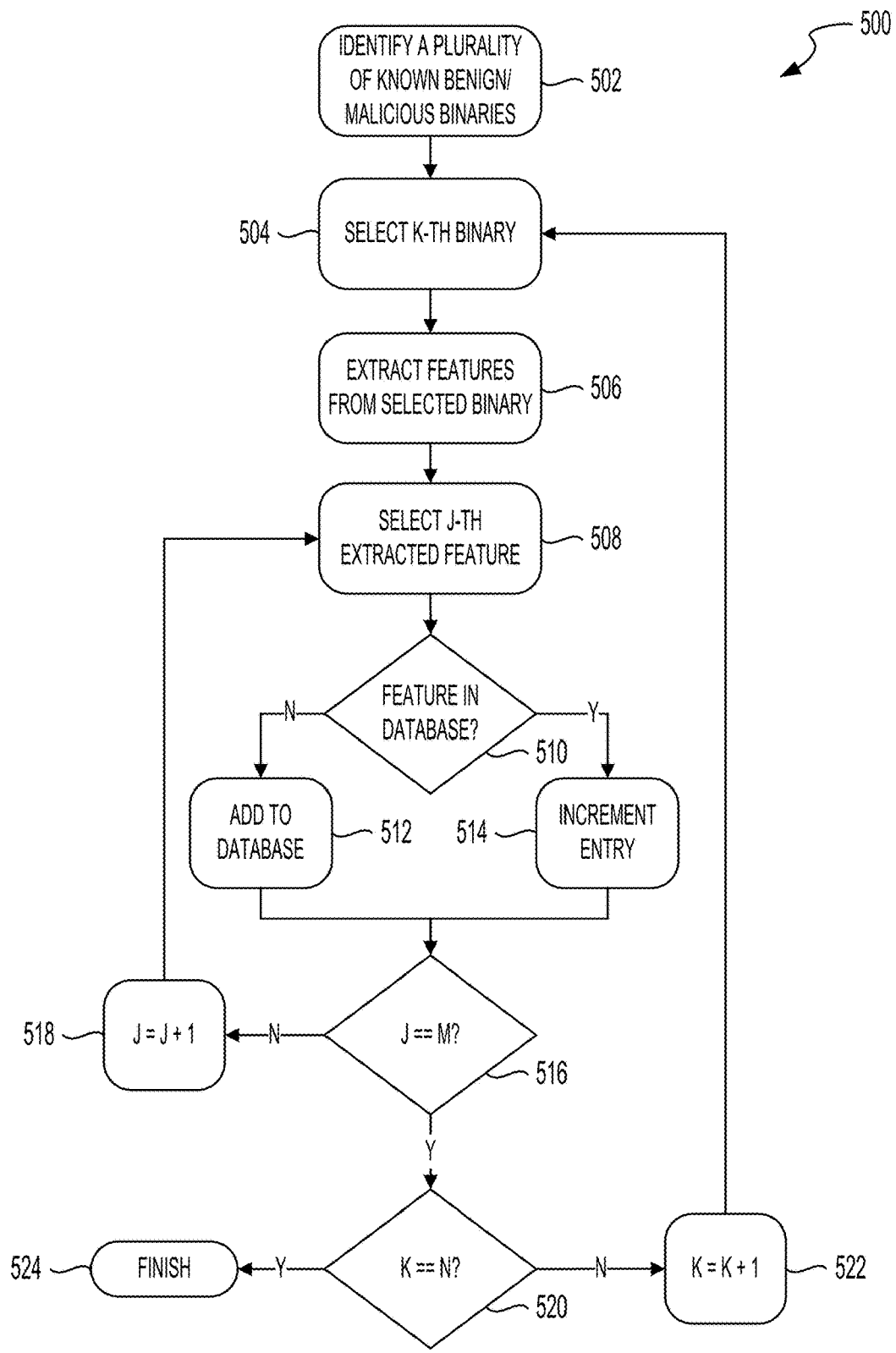
FIG. 5 is a flowchart illustrating an example method of populating a database based on identified sample features.

Referring now to FIG. 5, depicted is a flowchart illustrating an example method 500 of populating a database based on identified sample features. The method 500 can be implemented or performed using at least one data processing system 105 in conjunction with at least one database 115 detailed herein above in conjunction with FIG. 1. In brief overview, a data processing system (e.g., the data processing system 105), can identify a plurality of known benign and known malicious binaries (STEP 502). The data processing system can select the k-th binary (STEP 504). The data processing system can extract features from the selected binary (STEP 506). The data processing system can select the j-th feature (STEP 508). The data processing system can determine whether the selected feature is in the database (e.g., the database 115) (STEP 510). The data processing system can add the selected feature to the database (STEP 512). The data processing system can increment a database entry (STEP 514). The data processing system can determine whether the counter register j is equal to the number of features m (STEP 516). The data processing system can increment the counter register j (STEP 518). The data processing system can determine whether the counter register k is equal to the number of known benign and known malicious binaries (STEP 520). The data processing system can increment the counter register k (STEP 522). The data processing system can finish building the features in the database (STEP 524).

The data processing system (e.g., the data processing system 105), can identify a plurality of known benign and known malicious binaries (STEP 502). The plurality of binaries can include both a set of known malicious (e.g., previously identified, flagged, or otherwise indicated as associated with malicious activities, malware, etc.), and benign (e.g., previously identified, flagged, or otherwise indicated as associated with non-malicious, normal software, benign software, etc.) from a database (e.g., the database 115). Identifying the plurality of binaries can include accessing one or more data structures in the database to access a list of each of the malicious and benign binaries, code samples, or other type of identifiable sample. Accessing the database can include transmitting one or more requests for a list of samples to the database, and receiving a response from the database. The response can include a list of samples (e.g. binaries, computer code, computer data, etc.), and a list of associations indicating a classification for each sample in the list of samples. In some implementations, the data processing system can identify the list of known samples from the memory of the data processing system without accessing the database. For example, the data processing system can update the database using samples that are local to the data processing system, or received from an external computing device (e.g., one or more of the client devices 120, etc.) via network (e.g., the network 110, etc.). Each sample can include, for example, a sample identifier such as a name or a hash value (e.g., SHA-1 hash, MD5 hash, etc.) that can uniquely identify (or approximate a unique identification) each sample of the list of samples. The identifier of each sample can be included in the list of samples. The list of samples identified by the data processing system can include any identifiers, index values, names, associations, metadata, or other data included in or associated with each sample.

The data processing system can select the k-th binary (STEP 504). In order to process and add the reuse frequencies of the features of each sample (e.g., binary) to the database, the data processing system can iterate over each of the plurality of known malicious and known benign binaries identified in (STEP 502) described herein above. The sample can include, for example, computer code, computer instructions (e.g., executable instructions, op-codes, programs, scripts, etc.), application programming interface (API) calls, and strings, each of which may be extracted by the data processing system as a feature. The data processing system can iteratively loop through each of the plurality of known malicious and known benign samples based on a counter register k. Each of the plurality of samples can be indexed in a data structure by an index value (e.g., index 0, index 1, index 2, etc.). To process a sample, the data processing system can select the sample which includes or is associated with the index value which is equal to, or approximately equal to, the counter register k. If it is the first iteration of the loop, the counter register k can be initialized to an initialization value (e.g., k=0, k=1, etc.) before selecting the k-th sample in the list of samples. Selecting the sample can include copying the data associated with the sample to a different region of computer memory in the data processing system, for example a working region of memory. Selecting the sample can include retrieving the sample from the database if the sample is located in the database, and copying the data associated with the sample into a different region of computer memory in the data processing system, for example a working region of memory.

The data processing system can extract features from the selected binary (STEP 506). Extracting the features can include scanning, parsing, or otherwise analyzing the data included in the selected sample. Each feature extracted from the selected sample can correspond to a feature type. For example, the feature types can include a code block, an API call, and a string, among others. For each feature type present in the sample, the data processing system can extract each of features associated with the respective feature type to create a corresponding feature type set. Each feature type set can include some or all of the features present in the sample that correspond to the respective feature type. In some implementations, the data processing system can aggregate each of the feature type sets into a single set of features, thereby including all features and feature types present in the sample in an aggregated set of features. The data processing system can maintain a counter for each unique feature extracted from the selected sample, and subsequent to extracting a feature, increment the appropriate counter. Accordingly, upon extracting the features from the sample, the data processing system can associate each feature with an overall feature count that indicates the number of times the respective feature occurred (e.g., was present) in the selected sample. The process to extract each type of feature from the selected sample is described herein below.

To extract code block features, the data processing system can disassemble the executable code included in the sample to determine one or more code blocks. The data processing system can identify each code block as terminating with a code block termination instruction (e.g., a JMP instruction, a CALL instruction, any other instruction that executes a different line of code, a breakpoint, etc.). After identifying one or more code blocks, the data processing system can extract one or more op-codes (e.g., computer executable instructions, operations, etc.) from each code block to create a corresponding set of op-codes. Each of the set of op-codes can correspond to a respective one of the set of code blocks, and can include only the op-codes (e.g., no data, no reference pointers, etc.) that are present in the code blocks. In some implementations, the set of op-codes can include data, reference pointers, and other information in addition to the computer-executable instructions. After extracting the set of op-codes, where each of the set of op-codes includes one or more computer executable instructions, the data processing system can hash each of the set of code blocks. Hashing each of the set of code blocks can create a corresponding set of code hashes, where each code hash is representative (e.g., identifies, etc.) a respective one of the set of code-blocks. Each of the set of code hashes can be an extracted code block feature. In some implementations, the extracted code hashes themselves can correspond to the extracted code block feature. The data processing system can copy, for example, each code block feature into one or more data structures in the memory of the data processing system for processing in the steps described herein below.

To extract API function call features, the data processing system can disassemble the executable code included in the sample to determine one or more API call instructions. The data processing system can identify each API call as including one or more calls to a function that is external to the sample (e.g., a call to a library function, long jump call, etc.). After identifying one or more API calls, the data processing system can extract one or more function names (e.g., the name, address, library name, etc.) from each API call instruction to create a corresponding set of API function identifiers. Each of the set of API function identifiers can correspond to a respective one of the set of API call instructions. After extracting the set of API function identifiers, the data processing system can hash each of the set of API function identifiers. Hashing each of the set API function identifiers can create a corresponding set of API function hashes, where each API function hash is representative (e.g., identifies, etc.) a respective one of the set of API function identifiers. Each of the set of API function hashes can be an extracted API function call feature. In some implementations, the extracted API function calls themselves can correspond to the extracted API function call feature. The data processing system can copy, for example, each API function call feature into one or more data structures in the memory of the data processing system for processing in the steps described herein below.

To extract string features, the data processing system can disassemble the executable code included in the sample to parse one or more strings present in the sample. The data processing system can identify each string as including one or more characters (e.g., ASCII, Unicode, etc.) terminated by a string termination (e.g., a null terminator, etc.). After extracting one or more string features as a set of extracted strings, the data processing system can hash each of the set of extracted strings. Hashing each of the set extracted strings can create a corresponding set of string hashes, where each string hash is representative (e.g., identifies, etc.) a respective one of the set of extracted strings. Each of the set of string hashes can be an extracted string feature. In some implementations, the each of the extracted set of strings themselves can correspond to the extracted string feature. The data processing system can copy, for example, each string feature into one or more data structures in the memory of the data processing system for processing in the steps described herein below.

The data processing system can select the j-th feature (STEP 508). In order to process and identify the reuse frequencies of the features of each sample (e.g., binary) to the database, the data processing system can iterate over each of the features extracted in (STEP 506) described herein above. The features can include one or more feature types. For example, the method 500 may be performed once for each feature type, thereby creating a database cataloguing the frequencies of reuse of each feature type across known samples. In some implementations, the data processing system can aggregate all feature types extracted from the sample, thereby maintaining a single reuse database entry for each extracted feature and the corresponding reuse frequency. The data processing system can iteratively loop through each of the extracted features based on a counter register j. Each of the extracted features can be indexed in a data structure by an index value (e.g., index 0, index 1, index 2, etc.). To process a feature, the data processing system can select the feature that includes or is associated with the index value that is equal to, or approximately equal to, the counter register j. If it is the first iteration of the loop, the counter register j can be initialized to an initialization value (e.g., j=0, j=1, etc.) before selecting the j-th feature in the set of extracted features. Selecting the feature can include copying the data associated with the feature to a different region of computer memory in the data processing system, for example a working region of memory.

The data processing system can determine whether the selected feature is in the database (e.g., the database 115) (STEP 510). To determine whether the selected feature is in the database, the data processing system can transmit one or more queries to the database. If the selected feature is present in the database, the data processing system can receive one or more responses from the database indicating that the selected feature is present in the database, and perform (STEP 514) of the method 500. If the selected feature is not present in the database, the data processing system can receive one or more responses from the database indicating that the selected feature is not present in the database, and perform (STEP 512) of the method 500.

The data processing system can add the selected feature to the database (STEP 512). If the selected feature is not yet present in the database, the data processing system can add the selected feature to the database. Adding the feature to the database can include inserting, or transmitting one or more instructions to insert one or more data structures corresponding to the feature into the database. The instructions can include, for example, one or more SQL create functions or another type of database creation instructions. The data processing system can insert one or more indications of the feature, including whether the selected sample (e.g., binary) is a known malicious binary or a known benign binary, and number of occurrences of the selected feature in the selected sample. Accordingly, the data processing system can create and maintain an entry in the database that tracks the total number of occurrences of the selected feature in both malicious samples (e.g., binaries), benign samples (e.g., binaries), or any other type of classification of sample.

The data processing system can increment a database entry (STEP 514). Based on the number of occurrences of the selected feature in the selected sample determined in (STEP 506), the data processing system can update the database to increment the total number of occurrences of the selected sample for the corresponding classification category. For example, assume the database indicates that a particular feature has been identified as occurring 107 times in other known benign samples (e.g., binaries), and has been identified as occurring 199 times in other known malicious samples (e.g., binaries), and has been identified as occurring 1008 times in another classifications of samples (e.g., binaries). Furthering this example, if the selected sample (e.g., binary) is of a known malicious type, and the selected feature occurs 12 times in the selected sample, the data processing system can update the database by adding the number of occurrences in the sample to the count of malicious occurrences in the database. In this example, this would result in the malicious count of this sample in the database equaling 211. Although this example is directed primarily to a trinary classification scheme (e.g., malicious, benign, or other) it should be understood that a sample could have any number of possible classifications, and each of these possible classifications can be associated with a corresponding count maintained in the database.

The data processing system can determine whether the counter register j is equal to the number of features m (STEP 516). To determine whether the data processing system has updated the database to reflect the counts of each extracted feature, the data processing system can compare the counter register used to select each feature to the total number extracted features m. If the counter register j is not equal to (e.g., less than) the total number of extracted features m, the data processing system can execute (STEP 518). If the counter register j is equal to (e.g., equal to or greater than) the total number of extracted features m, the data processing system can execute (STEP 520).

The data processing system can increment the counter register j (STEP 518). In some implementations, the data processing system can add one to the register j to indicate the next unprocessed feature in the set of extracted features. In some implementations, the data processing system can set the counter register j to a memory address value (e.g., location in computer memory) of the next unprocessed feature. In some implementations, the memory address value of the next unprocessed feature can be included in the data structure at the location of the current (e.g., selected) feature. After incrementing the value of the counter register j, the data processing system can execute (STEP 508).

The data processing system can determine whether the counter register k is equal to the number of known benign and known malicious binaries (STEP 520). To determine whether the data processing system has extracted features from each of the identified samples, the data processing system can compare the counter register used to select each sample to the total number of identified samples n. If the counter register k is not equal to (e.g., less than) the total number of identified samples n, the data processing system can execute (STEP 522). If the counter register k is equal to (e.g., equal to or greater than) the total number of identified samples n, the data processing system can execute (STEP 524).

The data processing system can increment the counter register k (STEP 522). In some implementations, the data processing system can add one to the register k to indicate the next unprocessed sample in the set of identified samples. In some implementations, the data processing system can set the counter register k to a memory address value (e.g., location in computer memory) of the next unprocessed sample. In some implementations, the memory address value of the next unprocessed sample can be included in the data structure at the location of the current (e.g., selected) sample. After incrementing the value of the counter register k, the data processing system can execute (STEP 504).

The data processing system can finish building the features in the database (STEP 524). After the features have been extracted from all of the identified samples, the data processing system can finish performing the method 500. For example, the data processing system can take steps to de-allocate any memory regions provisioned to the processes or data structures described herein with respect to method 500, and may re-initialize each of the counter registers described herein to a predetermined initialization value. The predetermined initialization values can be retrieved, for example, from one or more data structures resident in the memory of the data processing system.

Figure 6:
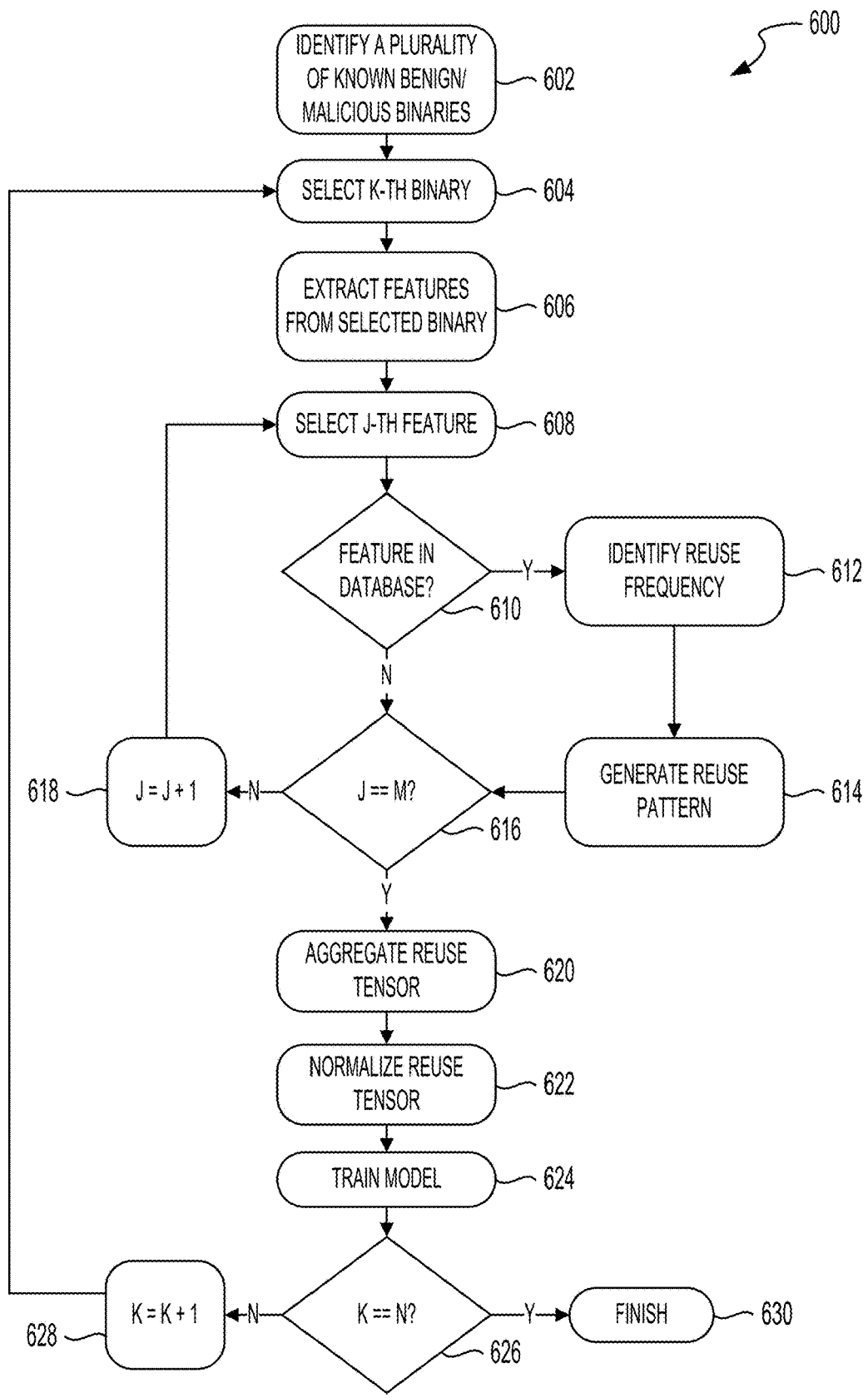
FIG. 6 is a flowchart illustrating an example method of training a classification model based on features identified in known samples and stored in the database.

Referring now to FIG. 6, depicted is a flowchart illustrating an example method 600 of training a classification model based on features identified in known samples and stored in a database. The method 600 can be implemented or performed using at least one data processing system 105 in conjunction with at least one database 115 detailed herein above in conjunction with FIG. 1. In brief overview, a data processing system (e.g., the data processing system 105), can identify a plurality of known benign and known malicious binaries (STEP 602). The data processing system can select the k-th binary (STEP 604). The data processing system can extract features from the selected binary (STEP 606). The data processing system can select the j-th feature (STEP 608). The data processing system can determine whether the selected feature is in the database (e.g., the database 115) (STEP 610). The data processing system can identify the reuse frequency of the feature (STEP 612). The data processing system can generate the reuse pattern (STEP 614). The data processing system can determine whether the counter register j is equal to the number of extracted features m (STEP 616). The data processing system can increment the counter register j (STEP 618). The data processing system can aggregate a reuse tensor (STEP 620). The data processing system can normalize the reuse tensor (STEP 622). The data processing system can train the classification model (STEP 624). The data processing system can determine whether the counter register k is equal to the number of identified binaries n (STEP 626). The data processing system can increment the counter register k (STEP 628). The data processing system can finish training the classification model (STEP 630).

The data processing system (e.g., the data processing system 105), can identify a plurality of known benign and known malicious binaries (STEP 602). The plurality of binaries can include both a set of known malicious (e.g., previously identified, flagged, or otherwise indicated as associated with malicious activities, malware, etc.), and benign (e.g., previously identified, flagged, or otherwise indicated as associated with non-malicious, normal software, benign software, etc.) from a database (e.g., the database 115). Identifying the plurality of binaries can include accessing one or more data structures in the database to access a list of each of the malicious and benign binaries, code samples, or other type of identifiable sample. Accessing the database can include transmitting one or more requests for a list of samples to the database, and receiving a response from the database. The response can include a list of samples (e.g. binaries, computer code, computer data, etc.), and a list of associations indicating a classification for each sample in the list of samples. In some implementations, the data processing system can identify the list of known samples from the memory of the data processing system without accessing the database. For example, the data processing system can update the database using samples that are local to the data processing system, or received from an external computing device (e.g., one or more of the client devices 120, etc.) via network (e.g., the network 110, etc.). Each sample can include, for example, a sample identifier such as a name or a hash value (e.g., SHA-1 hash, MD5 hash, etc.) that can uniquely identify (or approximate a unique identification) each sample of the list of samples. The identifier of each sample can be included in the list of samples. The list of samples identified by the data processing system can include any identifiers, index values, names, associations, metadata, or other data included in or associated with each sample.

The data processing system can select the k-th binary (STEP 604). In order to process and train the classification model based on the reuse frequencies of the features of each sample (e.g., binary), the data processing system can iterate over each of the plurality of known malicious and known benign binaries identified in (STEP 602) described herein above. The sample can include, for example, computer code, computer instructions (e.g., executable instructions, op-codes, programs, scripts, etc.), application programming interface (API) calls, and strings, each of which may be extracted by the data processing system as a feature. The data processing system can iteratively loop through each of the plurality of known malicious and known benign samples based on a counter register k. Each of the plurality of samples can be indexed in a data structure by an index value (e.g., index 0, index 1, index 2, etc.). To process a sample, the data processing system can select the sample which includes or is associated with the index value that is equal to, or approximately equal to, the counter register k. If it is the first iteration of the loop, the counter register k can be initialized to an initialization value (e.g., k=0, k=1, etc.) before selecting the k-th sample in the list of samples. Selecting the sample can include copying the data associated with the sample to a different region of computer memory in the data processing system, for example a working region of memory. Selecting the sample can include retrieving the sample from the database if the sample is located in the database, and copying the data associated with the sample into a different region of computer memory in the data processing system, for example a working region of memory.

The data processing system can extract features from the selected binary (STEP 606). Extracting the features can include scanning, parsing, or otherwise analyzing the data included in the selected sample. Each feature extracted from the selected sample can correspond to a feature type. For example, the feature types can include a code block, an API call, and a string, among others. For each feature type present in the sample, the data processing system can extract each of features associated with the respective feature type to create a corresponding feature type set. Each feature type set can include some or all of the features present in the sample that correspond to the respective feature type. In some implementations, the data processing system can aggregate each of the feature type sets into a single set of features, thereby including all features and feature types present in the sample in an aggregated set of features. The data processing system can maintain a counter for each unique feature extracted from the selected sample, and subsequent to extracting a feature, increment the appropriate counter. Accordingly, upon extracting the features from the sample, the data processing system can associate each feature with an overall feature count that indicates the number of times the respective feature occurred (e.g., was present) in the selected sample. The process to extract each type of feature from the selected sample is described herein below.

To extract code block features, the data processing system can disassemble the executable code included in the sample to determine one or more code blocks. The data processing system can identify each code block as terminating with a code block termination instruction (e.g., a JMP instruction, a CALL instruction, any other instruction that executes a different line of code, a breakpoint, etc.). After identifying one or more code blocks, the data processing system can extract one or more op-codes (e.g., computer executable instructions, operations, etc.) from each code block to create a corresponding set of op-codes. Each of the set of op-codes can correspond to a respective one of the set of code blocks, and can include only the op-codes (e.g., no data, no reference pointers, etc.) that are present in the code blocks. In some implementations, the set of op-codes can include data, reference pointers, and other information in addition to the computer-executable instructions. After extracting the set of op-codes, where each of the set of op-codes includes one or more computer executable instructions, the data processing system can hash each of the set of code blocks. Hashing each of the set of code blocks can create a corresponding set of code hashes, where each code hash is representative (e.g., identifies, etc.) a respective one of the set of code-blocks. Each of the set of code hashes can be an extracted code block feature. In some implementations, the extracted code blocks themselves can correspond to the extracted code block feature. The data processing system can determine the weight value of the extracted feature as the number of opcodes that are included in the extracted code block. The data processing system can store an association between the determined feature weight and the extracted feature. The data processing system can copy, for example, each code block feature, along with its associated weight value, into one or more data structures in the memory of the data processing system for processing in the steps described herein below.

To extract API function call features, the data processing system can disassemble the executable code included in the sample to determine one or more API call instructions. The data processing system can identify each API call as including one or more calls to a function that is external to the sample (e.g., a call to a library function, long jump call, etc.). After identifying one or more API calls, the data processing system can extract one or more function names (e.g., the name, address, library name, etc.) from each API call instruction to create a corresponding set of API function identifiers. Each of the set of API function identifiers can correspond to a respective one of the set of API call instructions. After extracting the set of API function identifiers, the data processing system can hash each of the set of API function identifiers. Hashing each of the set API function identifiers can create a corresponding set of API function hashes, where each API function hash is representative (e.g., identifies, etc.) a respective one of the set of API function identifiers. Each of the set of API function hashes can be an extracted API function call feature. In some implementations, the extracted API function calls themselves can correspond to the extracted API function call feature. The data processing system can determine the weight value of the extracted feature as the number of API calls sharing the same API name that are extracted from the selected sample. The data processing system can store an association between the determined feature weight and the extracted feature. The data processing system can copy, for example, each API function call feature, along with its associated weight value, into one or more data structures in the memory of the data processing system for processing in the steps described herein below.

To extract string features, the data processing system can disassemble the executable code included in the sample to parse one or more strings present in the sample. The data processing system can identify each string as including one or more characters (e.g., ASCII, Unicode, etc.) terminated by a string termination (e.g., a null terminator, etc.). After extracting one or more string features as a set of extracted strings, the data processing system can hash each of the set of extracted strings. Hashing each of the set extracted strings can create a corresponding set of string hashes, where each string hash is representative (e.g., identifies, etc.) a respective one of the set of extracted strings. Each of the set of string hashes can be an extracted string feature. In some implementations, the each of the extracted set of strings themselves can correspond to the extracted string feature. The data processing system can determine the weight value of the extracted feature as the number of characters that are included in the extracted string. The data processing system can store an association between the determined feature weight and the extracted feature. The data processing system can copy, for example, each string feature, along with its associated weight value, into one or more data structures in the memory of the data processing system for processing in the steps described herein below.

The data processing system can select the j-th feature (STEP 608). In order to process and identify the reuse frequencies of the features of each sample (e.g., binary) to the database, the data processing system can iterate over each of the features extracted in (STEP 506) described herein above. The features can include one or more feature types. For example, the method 500 may be performed once for each feature type, thereby creating a database cataloguing the frequencies of reuse of each feature type across known samples. In some implementations, the data processing system can aggregate all feature types extracted from the sample, thereby maintaining a reuse frequency value for each extracted feature in a single set of reuse frequencies. The data processing system can iteratively loop through each of the extracted features based on a counter register j. Each of the extracted features can be indexed in a data structure by an index value (e.g., index 0, index 1, index 2, etc.). To process a feature, the data processing system can select the feature that includes or is associated with the index value that is equal to, or approximately equal to, the counter register j. If it is the first iteration of the loop, the counter register j can be initialized to an initialization value (e.g., j=0, j=1, etc.) before selecting the j-th feature in the set of extracted features. Selecting the feature can include copying the data associated with the feature to a different region of computer memory in the data processing system, for example a working region of memory.

The data processing system can determine whether the selected feature is in the database (e.g., the database 115) (STEP 610). To determine whether the selected feature is in the database, the data processing system can transmit one or more queries to the database. If the selected feature is present in the database, the data processing system can receive one or more responses from the database indicating that the selected feature is present in the database, and perform (STEP 612) of the method 600. If the selected feature is not present in the database, the data processing system can receive one or more responses from the database indicating that the selected feature is not present in the database, and perform (STEP 616) of the method 600.

The data processing system can identify the reuse frequency of the feature (STEP 612). Identifying the reuse frequency of a particular feature can include querying the database to request the total number of occurrences of the feature in question for some or all potential classifications. For example, a database query, or request, could include a request for the number of occurrences of the selected feature as they have occurred in samples that are classified as benign. In response to this request, the database can return one or more values indicating the values in the request, which in this example is the number of occurrences of the selected feature in samples classified as benign. In some implementations, the request can include more than one classification type. In such implementations, the database can return one or more data structures in one or more messages indicating the number of occurrences of the feature included as identified in samples that correspond to each classification identified in the request. For example, a request can include a feature, and a request for the number of occurrences of the feature in malicious samples and the number of occurrences of the feature in benign samples. Furthering this example, the data processing system can return a message indicating that the feature has been observed in 504 benign samples and 2020 malicious samples. These values, while illustrative of a possible outcome of a request, should be understood as exemplary only and should not be construed as a required output of the database or any other component of the system. Further, although this example includes only two types of classifications (e.g., malicious and benign), it should be understood that a request, and the corresponding response, can include any number of classification types described herein or otherwise. Each response value received from the database associated with a particular classification can be the reuse frequency of the selected sample with respect to a particular classification.

The data processing system can generate the reuse pattern (STEP 614). Using the reuse frequency that was gathered from the database in (STEP 612), the data processing system can generate a reuse pattern that is representative of the sample and its reuse values. To generate the reuse pattern, the data processing system can create a bit string for each possible classification type (e.g., associated with the sample or the classification model to be trained. Each position in each bit string can represent one or more frequency reuse ranges, or buckets. The ranges can be indicative of a particular range of values for each reuse value. An example table representing such a bit string is included below in Table 1.

TABLE 1

| Classification | 0 | 1-10 | 11-100 | 101-500 | >500 |
| --- | --- | --- | --- | --- | --- |
| Malicious | 0 | 0 | 0 | 0 | 1 |
| Benign | 0 | 0 | 1 | 0 | 0 |

For the purposes of the exemplary Table 1, each row of the table including binary numbers can represent a bit string corresponding to a respective classification, noted in the "Classification" column. The labels 'Malicious' and 'Benign' are merely added to identify an association of the bit string with the corresponding classification type. In this example, the number of occurrences of the selected feature in malicious samples was 609, and the number of occurrences of the selected feature in benign samples was 88. Accordingly, the bit position corresponding to the "greater than 500" bucket is set to binary one, and all other bit values are cleared to binary zero for the malicious bit string. Likewise, the bit position corresponding to the "11-100" bucket is set to binary one, and all other positions are cleared to binary zero for each of the other bit positions. To generate the final reuse vector (e.g., bit string) for the feature, the data processing system can concatenate each of the bit strings, together, thereby creating a single bit string comprising each of the bit strings corresponding to a respective feature type. In this example, the exemplary bit string could be "0000100100," or it could be "0010000001," or any other combination of the bits in Table 1 above.

The data processing system can determine whether the counter register j is equal to the number of extracted features m (STEP 616). To determine whether the data processing system has generated a reuse vector for each extracted feature of the selected sample, the data processing system can compare the counter register used to select each feature to the total number extracted features m. If the counter register j is not equal to (e.g., less than) the total number of extracted features m, the data processing system can execute (STEP 618). If the counter register j is equal to (e.g., equal to or greater than) the total number of extracted features m, the data processing system can execute (STEP 620).

The data processing system can increment the counter register j (STEP 618). In some implementations, the data processing system can add one to the register j to indicate the next unprocessed feature in the set of extracted features. In some implementations, the data processing system can set the counter register j to a memory address value (e.g., location in computer memory) of the next unprocessed feature. In some implementations, the memory address value of the next unprocessed feature can be included in the data structure at the location of the current (e.g., selected) feature. After incrementing the value of the counter register j, the data processing system can execute (STEP 608).

The data processing system can aggregate a reuse tensor (STEP 620). After generating a reuse vector (e.g., bit string) for each of the extracted features of the selected sample, the data processing system can aggregate the generated reuse vectors into a reuse tensor that is representative of the sample. The rows of the reuse tensor can each correspond to a unique value of the generated reuse vectors. For example, if the generated reuse vectors had the same dimensions as defined by the example set forth above with respect to Table 1, the reuse tensor can have twenty-five rows, each row corresponding to one of the possible reuse vectors. The reuse tensor can include at least three columns, including an overall sum of weights, a count of features, and the average weight. Because the number of bucket ranges (e.g., bit positions) in each generated bit vector can be small when compared to the overall number of extracted features, there can be an overlap in the number of features vs the number of rows in the tensor. Accordingly, the features must be aggregated together in the reuse tensor. To aggregate the reuse vectors associated with each feature into the tensor associated with the sample, the sum of weights column can include total sum of the weight values of each feature having the same reuse vector, or pattern of reuse. This is best illustrated below in Table 2.

TABLE 2

| Pattern of Reuse | Sum of Weights | Count | Average Weight |
|---|---|---|---|
| ... | ... | ... | ... |
| 0000101000 | 154 + 48 = 202 | 2 | 101 |
| 0000100100 | 75 | 1 | 75 |
| ... | ... | ... | ... |

In this example, the selected sample has a total of three features. Two of the three features have an identical reuse vector (e.g., reuse bit string), while the third has a different bit string. To aggregate samples with alike reuse vectors, the data processing system can calculate the sum of each of the weight values of each feature having the same reuse vector, and store the resulting computation in the sum of weights column for the corresponding row. In this example, the first feature has a weight of 154, and is associated with the reuse vector "0000101000." The second feature has a weight of 48, and is also associated with the reuse vector "0000101000." To include the data from each of these different features in the reuse tensor, the data processing system can sum the total of their weight (shown in Table 2 as 154+48=202), and store this value in the sum of weights column for the corresponding reuse vector, here "0000101000." Furthering this example, the third feature is associated with the reuse vector "0000100100," and is associated with the weight value 75. Because the reuse vector of the third feature is different from the reuse vectors of the first and second features, the data processing system can place the corresponding sum of weight values (here only 75) in the sum of weights column.

The data processing can populate the "Count" column associated with the corresponding reuse vector by counting the total number of features extracted from the selected sample are associated with that reuse vector. Referring back to the example outlined above with respect to Table 2, the data processing system can determine that the reuse vector "0000101000" corresponds to two features in the selected same (e.g., the first feature and the second feature), and the reuse vector "0000100100" corresponds to only the third feature. Accordingly, in this example, the data processing system can populate the "Count" for the row corresponding to the reuse vector "0000101000" with 2, to represent the first and second features, and populate the "Count" column for the row corresponding to the reuse vector "0000100100" with 1 to represent the first feature. The data processing system can populate the average weight value for a given row by dividing the sum of the weight values for a given row by the count of the features for the same row. Accordingly, the data processing system can update the "Average Weight" column with the average weight of each feature extracted from the sample that is associated with a particular reuse vector. Based the aggregated reuse vectors calculations and determinations, the data processing system can construct a reuse tensor for a sample that represents each of the aggregated reuse information for each feature.

The data processing system can normalize the reuse tensor (STEP 622). Normalizing the reuse tensor can include, for example, performing one or more calculations on each row or each column of the reuse tensor to align each of the reuse tensor values between two range values, for example zero and one. In some implementations, data processing system can normalize the reuse tensor by row. For example, the data processing system can determine the largest value in each row, and divide each value in the respective row by the largest value, thereby creating a proportional value that is between zero and one at each position in the row. In some implementations, data processing system can normalize the reuse tensor by column. For example, the data processing system can determine the largest value in each column, and divide each value in the respective column by the largest value, thereby creating a proportional value that is between zero and one at each position in the column. In some implementations, data processing system can normalize the reuse tensor in its entirety. For example, the data processing system can determine the largest value in the reuse tensor, and divide each value in the reuse tensor by the largest value, thereby creating a proportional value that is between zero and one at each position in the reuse tensor. In some implementations, the data processing system does not normalize the reuse tensor, and instead simply performs (STEP 624) of the method 600.

The data processing system can train the classification model (STEP 624). Training the classification model (e.g., the classification model 170) can include, for example inputting the calculated reuse tensor into the classification model and comparing the output of the model to the known classification of the sample. For example, the classification model could be a neural network, trained using a gradient descent process. The neural network can include a number of weights and biases. The data processing system can adjust the weights and biases of the neural network based on the output of the neural network when a reuse tensor is provided as input. The data processing system can adjust the weights and biases using a gradient descent, or other type of machine learning algorithm. In some implementations, the classification model can be a linear regression model, a recurrent neural network model, an long-short term memory model, or any other type of machine learning model. In some implementations, the data processing system can store the determined reuse vector for later processing, and instead train the model using a batch processing model, where each of the stored reuse tensors associated with each of the identified samples (e.g., binaries) are used to train the classification model in batches, or groups of a predetermined size. The batches of reuse tensors can be determined based on the output received from the classification model.

The data processing system can determine whether the counter register k is equal to the number of identified binaries n (STEP 626). To determine whether the data processing system has extracted features from each of the identified samples, the data processing system can compare the counter register used to select each sample to the total number of identified samples n. If the counter register k is not equal to (e.g., less than) the total number of identified samples n, the data processing system can execute (STEP 628). If the counter register k is equal to (e.g., equal to or greater than) the total number of identified samples n, the data processing system can execute (STEP 630).

The data processing system can increment the counter register k (STEP 628). In some implementations, the data processing system can add one to the register k to indicate the next unprocessed feature in the set of extracted features. In some implementations, the data processing system can set the counter register k to a memory address value (e.g., location in computer memory) of the next unprocessed feature. In some implementations, the memory address value of the next unprocessed feature can be included in the data structure at the location of the current (e.g., selected) feature. After incrementing the value of the counter register j, the data processing system can execute (STEP 604).

The data processing system can finish training the classification model (STEP 630). The data processing system can finish training the classification model by storing, for example, the trained classification model in one or more data structures. In some implementations, the data processing system can de-allocate any memory temporarily allocated to perform the operations described herein above with respect to method 600. In some implementations, the data processing system can set the counter registers k and j to their respective initialization values, for example zero.

Figure 7:
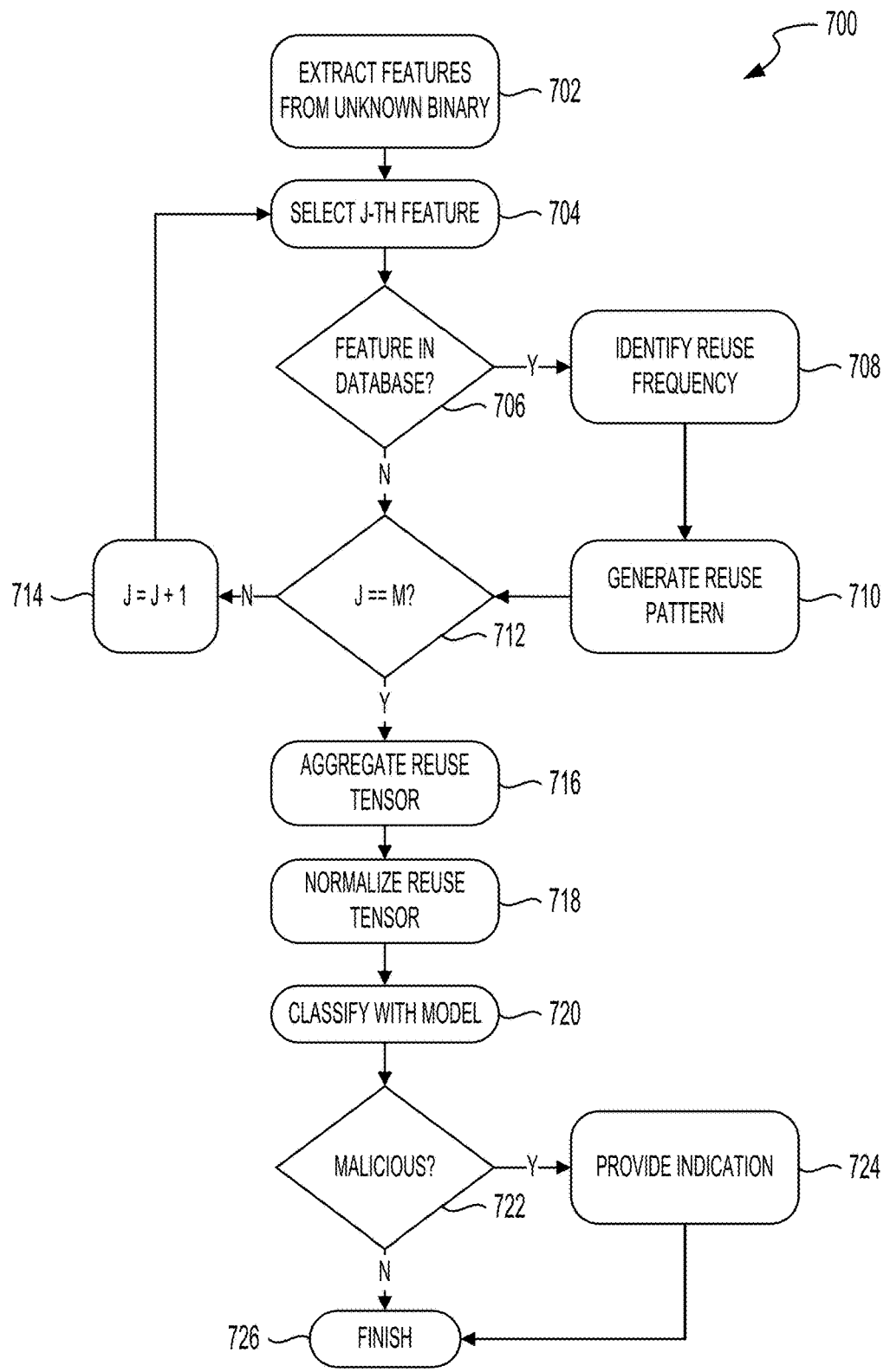
FIG. 7 is a flowchart illustrating an example method of classifying an unknown sample based on extracted features an a malware classification model.

Referring now to FIG. 7, depicted is a flowchart illustrating an example method 700 of classifying an unknown sample based on extracted features and a malware classification model. The method 700 can be implemented or performed using at least one data processing system 105 in conjunction with at least one database 115 detailed herein above in conjunction with FIG. 1. In brief overview, a data processing system (e.g., the data processing system 105) can extract features from an unknown binary (STEP 702). The data processing system can select the j-th feature (STEP 704). The data processing system can determine whether the selected feature is in the database (e.g., the database 115) (STEP 706). The data processing system can identify the reuse frequency of the selected feature (STEP 708). The data processing system can generate a reuse pattern (STEP 710). The data processing system can determine whether the counter register j is equal to the number of extracted features m (STEP 712). The data processing system can increment the counter register j (STEP 714). The data processing system can aggregate a reuse tensor (STEP 716). The data processing system can normalize the reuse tensor (STEP 718). The data processing system can classify the unknown binary using a classification model (STEP 720). The data processing system can determine whether the unknown binary is malicious (STEP 722). The data processing system can provide an indication that the unknown binary is malicious (STEP 724). The data processing system can finish classifying the unknown binary (STEP 726).

The data processing system (e.g., the data processing system 105) can extract features from an unknown binary (STEP 702). Extracting the features can include scanning, parsing, or otherwise analyzing the data included in the unknown sample (e.g., unknown binary). Each feature extracted from the selected sample can correspond to a feature type. For example, the feature types can include a code block, an API call, and a string, among others. For each feature type present in the sample, the data processing system can extract each features associated with the respective feature type to create a corresponding feature type set. Each feature type set can include some or all of the features present in the sample that correspond to the respective feature type (e.g., some or all code blocks in a first set, some or all API calls in a second set, some or all strings in a third set, etc.). In some implementations, the data processing system can aggregate each of the feature type sets into a single set of features, thereby including all features present in the sample in an aggregated set of features. The data processing system can maintain a counter for each unique feature extracted from the selected sample, and subsequent to extracting a feature, increment the appropriate counter. Accordingly, upon extracting the features from the sample, the data processing system can associate each feature with an overall feature count that indicates the number of times the respective feature occurred (e.g., was present) in the selected sample. The process to extract each type of feature from the selected sample is described herein below.

To extract code block features, the data processing system can disassemble executable code included in the sample to identify one or more code blocks. The data processing system can identify each code block as terminating with a code block termination instruction (e.g., a JMP instruction, a CALL instruction, any other instruction that executes a different line of code, a breakpoint, etc.). After identifying one or more code blocks, the data processing system can extract one or more op-codes (e.g., computer executable instructions, operations, etc.) from each code block to create a corresponding set of op-codes. Each of the set of op-codes can correspond to a respective one of the set of code blocks, and can include only the op-codes (e.g., no data, no reference pointers, etc.) that are present in the code blocks. In some implementations, the set of op-codes can include data, reference pointers, and other information in addition to the computer-executable instructions. After extracting the set of op-codes, where each of the set of op-codes includes one or more computer executable instructions, the data processing system can hash each of the set of code blocks. Hashing each of the set of code blocks can create a corresponding set of code hashes, where each code hash is representative (e.g., identifies, etc.) a respective one of the set of code-blocks. Each of the set of code hashes can be an extracted code block feature. In some implementations, the extracted code blocks themselves can correspond to the extracted code block feature. The data processing system can determine the weight value of the extracted feature as the number of opcodes that are included in the extracted code block. The data processing system can store an association between the determined feature weight and the extracted feature. The data processing system can copy, for example, each code block feature, along with its associated weight value, into one or more data structures in the memory of the data processing system for processing in the steps described herein below.

To extract API function call features, the data processing system can disassemble the executable code included in the sample to determine one or more API call instructions. The data processing system can identify each API call as including one or more calls to a function that is external to the sample (e.g., a call to a library function, long jump call, etc.). After identifying one or more API calls, the data processing system can extract one or more function names (e.g., the name, address, library name, etc.) from each API call instruction to create a corresponding set of API function identifiers. Each of the set of API function identifiers can correspond to a respective one of the set of API call instructions. After extracting the set of API function identifiers, the data processing system can hash each of the set of API function identifiers. Hashing each of the set API function identifiers can create a corresponding set of API function hashes, where each API function hash is representative (e.g., identifies, etc.) a respective one of the set of API function identifiers. Each of the set of API function hashes can be an extracted API function call feature. In some implementations, the extracted API function calls themselves can correspond to the extracted API function call feature. The data processing system can determine the weight value of the extracted feature as the number of API calls sharing the same API name that are extracted from the selected sample. The data processing system can store an association between the determined feature weight and the extracted feature. The data processing system can copy, for example, each API function call feature, along with its associated weight value, into one or more data structures in the memory of the data processing system for processing in the steps described herein below.

To extract string features, the data processing system can disassemble the executable code included in the sample to parse one or more strings present in the sample. The data processing system can identify each string as including one or more characters (e.g., ASCII, Unicode, etc.) terminated by a string termination (e.g., a null terminator, etc.). After extracting one or more string features as a set of extracted strings, the data processing system can hash each of the set of extracted strings. Hashing each of the set extracted strings can create a corresponding set of string hashes, where each string hash is representative (e.g., identifies, etc.) a respective one of the set of extracted strings. Each of the set of string hashes can be an extracted string feature. In some implementations, the each of the extracted set of strings themselves can correspond to the extracted string feature. The data processing system can determine the weight value of the extracted feature as the number of characters that are included in the extracted string. The data processing system can store an association between the determined feature weight and the extracted feature. The data processing system can copy, for example, each string feature, along with its associated weight value, into one or more data structures in the memory of the data processing system for processing in the steps described herein below.

The data processing system can select the j-th feature (STEP 704). In order to process and identify the reuse frequencies of the features of the unknown sample (e.g., unknown binary) to the database, the data processing system can iterate over each of the features extracted in (STEP 506) described herein above. The features can include one or more feature types. For example, the method 500 may be performed once for each feature type, thereby creating a database cataloguing the frequencies of reuse of each feature type across known samples. In some implementations, the data processing system can aggregate all feature types extracted from the sample, thereby maintaining a reuse frequency value for each extracted feature in a single set of reuse frequencies. The data processing system can iteratively loop through each of the extracted features based on a counter register j. Each of the extracted features can be indexed in a data structure by an index value (e.g., index 0, index 1, index 2, etc.). To process a feature, the data processing system can select the feature that includes or is associated with the index value that is equal to, or approximately equal to, the counter register j. If it is the first iteration of the loop, the counter register j can be initialized to an initialization value (e.g., j=0, j=1, etc.) before selecting the j-th feature in the set of extracted features. Selecting the feature can include copying the data associated with the feature to a different region of computer memory in the data processing system, for example a working region of memory The data processing system can determine whether the selected feature is in the database (e.g., the database 115) (STEP 706). To determine whether the selected feature is in the database, the data processing system can transmit one or more queries to the database. If the selected feature is present in the database, the data processing system can receive one or more responses from the database indicating that the selected feature is present in the database, and perform (STEP 708) of the method 600. If the selected feature is not present in the database, the data processing system can receive one or more responses from the database indicating that the selected feature is not present in the database, and perform (STEP 712) of the method 600.

The data processing system can identify the reuse frequency of the selected feature (STEP 708). Identifying the reuse frequency of a particular feature can include querying the database to request the total number of occurrences of the selected feature for some or all classification types. For example, a database query, or request transmitted to the database, could include a request for the number of occurrences of the selected feature as they have occurred in samples that are classified as benign. In response to this request, the database can return one or more values indicating the values in the request, which in this example is the number of occurrences of the selected feature in samples classified as benign. In some implementations, the request can include more than one classification type. In such implementations, the database can return one or more data structures in one or more messages indicating the number of occurrences of the feature included as identified in samples that correspond to each classification identified in the request. For example, a request can include a feature, and a request for the number of occurrences of the feature in malicious samples and the number of occurrences of the feature in benign samples. Furthering this example, the data processing system can return a message indicating that the feature has been observed in 504 benign samples and 2020 malicious samples. These values, while illustrative of a possible outcome of a request, should be understood as exemplary only and should not be construed as a required output of the database or any other component of the system. Further, although this example includes only two types of classifications (e.g., malicious and benign), it should be understood that a request, and the corresponding response, can include any number of classification types described herein or otherwise. Each response value received from the database associated with a particular classification can be the reuse frequency of the selected sample with respect to a particular classification The data processing system can generate a reuse pattern (STEP 710). Using the reuse frequency that was gathered from the database in (STEP 708), the data processing system can generate a reuse pattern that is representative of the feature and the corresponding reuse frequency in various classifications. To generate the reuse pattern, the data processing system can create a bit string for each possible classification type (e.g., associated with the sample or the classification model to be trained. Each position in each bit string can represent one or more frequency reuse ranges, or buckets. The ranges can be indicative of a particular range of values for each reuse value. An example table representing such a bit string is included below in Table 1.

TABLE 3

| Classification | 0 | 1-10 | 11-100 | 101-500 | >500 |
|---|---|---|---|---|---|
| Malicious | 0 | 0 | 0 | 1 | 0 |
| Benign | 0 | 1 | 0 | 0 | 0 |

For the purposes of the exemplary Table 3, each row of the table including binary numbers can represent a bit string corresponding to a respective classification, noted in the "Classification" column. The labels 'Malicious' and 'Benign' are merely added to identify an association of the bit string with the corresponding classification type. In this example, the number of occurrences of the selected feature in malicious samples was 158, and the number of occurrences of the selected feature in benign samples was 6. Accordingly, the bit position corresponding to the "101-500" bucket is set to binary one, and all other bit values are cleared to binary zero for the malicious bit string. Likewise, the bit position corresponding to the "1-10" bucket is set to binary one, and all other positions are cleared to binary zero for each of the other bit positions. To generate the final reuse vector (e.g., bit string) for the feature, the data processing system can concatenate each of the bit strings, together, thereby creating a single bit string comprising each of the bit strings corresponding to a respective feature type. In this example, the exemplary bit string could be "0001001000," or it could be "0100000010," or any other combination of the bits in Table 3 above.

The data processing system can determine whether the counter register j is equal to the number of extracted features m (STEP 712). To determine whether the data processing system has generated a reuse vector for each extracted feature of the selected sample, the data processing system can compare the counter register used to select each feature to the total number extracted features m. If the counter register j is not equal to (e.g., less than) the total number of extracted features m, the data processing system can execute (STEP 714). If the counter register j is equal to (e.g., equal to or greater than) the total number of extracted features m, the data processing system can execute (STEP 716).

The data processing system can increment the counter register j (STEP 714). In some implementations, the data processing system can add one to the register j to indicate the next unprocessed feature in the set of extracted features. In some implementations, the data processing system can set the counter register j to a memory address value (e.g., location in computer memory) of the next unprocessed feature. In some implementations, the memory address value of the next unprocessed feature can be included in the data structure at the location of the current (e.g., selected) feature. After incrementing the value of the counter register j, the data processing system can execute (STEP 704).

The data processing system can aggregate a reuse tensor (STEP 716). After generating a reuse vector (e.g., bit string) for each of the extracted features of the selected sample, the data processing system can aggregate the generated reuse vectors into a reuse tensor that is representative of the sample. The rows of the reuse tensor can each correspond to a unique value of the generated reuse vectors. For example, if the generated reuse vectors had the same dimensions as defined by the example set forth above with respect to Table 3, the reuse tensor can have twenty-five rows, each row corresponding to one of the possible reuse vectors. The reuse tensor can include at least three columns, including an overall sum of weights, a count of features, and the average weight. Because the number of bucket ranges (e.g., bit positions) in each generated bit vector can be small when compared to the overall number of extracted features, there can be an overlap in the number of features vs the number of rows in the tensor. Accordingly, the features must be aggregated together in the reuse tensor. To aggregate the reuse vectors associated with each feature into the tensor associated with the sample, the sum of weights column can include total sum of the weight values of each feature having the same reuse vector, or pattern of reuse. This is best illustrated below in Table 4.

TABLE 4

| Pattern of Reuse | Sum of Weights | Count | Average Weight |
|---|---|---|---|
| . . . | . . . | . . . | . . . |
| 0000101000 | 154 + 48 = 202 | 2 | 101 |
| 0000100100 | 75 | 1 | 75 |
| . . . | . . . | . . . | . . . |

In this example, the selected sample has a total of three features. Two of the three features have an identical reuse vector (e.g., reuse bit string), while the third has a different bit string. To aggregate samples with alike reuse vectors, the data processing system can calculate the sum of each of the weight values of each feature having the same reuse vector, and store the resulting computation in the sum of weights column for the corresponding row. In this example, the first feature has a weight of 154, and is associated with the reuse vector "0000101000." The second feature has a weight of 48, and is also associated with the reuse vector "0000101000." To include the data from each of these different features in the reuse tensor, the data processing system can sum the total of their weight (shown in Table 4 as 154+48=202), and store this value in the sum of weights column for the corresponding reuse vector, here "0000101000." Furthering this example, the third feature is associated with the reuse vector "0000100100," and is associated with the weight value 75. Because the reuse vector of the third feature is different from the reuse vectors of the first and second features, the data processing system can place the corresponding sum of weight values (here only 75) in the sum of weights column.

The data processing can populate the "Count" column associated with the corresponding reuse vector by counting the total number of features extracted from the selected sample are associated with that reuse vector. Referring back to the example outlined above with respect to Table 2, the data processing system can determine that the reuse vector "0000101000" corresponds to two features in the selected same (e.g., the first feature and the second feature), and the reuse vector "0000100100" corresponds to only the third feature. Accordingly, in this example, the data processing system can populate the "Count" for the row corresponding to the reuse vector "0000101000" with 2, to represent the first and second features, and populate the "Count" column for the row corresponding to the reuse vector "0000100100" with 1 to represent the first feature. The data processing system can populate the average weight value for a given row by dividing the sum of the weight values for a given row by the count of the features for the same row. Accordingly, the data processing system can update the "Average Weight" column with the average weight of each feature extracted from the sample that is associated with a particular reuse vector. Based the aggregated reuse vectors calculations and determinations, the data processing system can construct a reuse tensor for a sample that represents each of the aggregated reuse information for each feature.

The data processing system can normalize the reuse tensor (STEP 718). Normalizing the reuse tensor can include, for example, performing one or more calculations on each row or each column of the reuse tensor to align each of the reuse tensor values between two range values, for example zero and one. In some implementations, data processing system can normalize the reuse tensor by row. For example, the data processing system can determine the largest value in each row, and divide each value in the respective row by the largest value, thereby creating a proportional value that is between zero and one at each position in each row. In some implementations, data processing system can normalize the reuse tensor by column. For example, the data processing system can determine the largest value in each column, and divide each value in the respective column by the largest value, thereby creating a proportional value that is between zero and one at each position in the column. In some implementations, data processing system can normalize the reuse tensor in its entirety. For example, the data processing system can determine the largest value in the reuse tensor, and divide each value in the reuse tensor by the largest value, thereby creating a proportional value that is between zero and one at each position in the reuse tensor. In some implementations, the data processing system does not normalize the reuse tensor, and instead simply performs (STEP 720) of the method 700.

The data processing system can classify the unknown binary using a classification model (STEP 720). Classifying the unknown binary can include inputting the normalized (or non-normalized, as the case may be) reuse tensor into the trained classification model (e.g., the classification model 170). The classification model can be trained, for example, using the method 600 described herein above in conjunction with FIG. 6. This can include, for example, applying each value of the normalized reuse tensor as an input value to a classification function carried out by the classification model. An output of the classification model can be a predicted classification type. In some implementations, the model can provide a percent confidence value that corresponds to the predicted likelihood of a particular sample being associated with a certain classification type. For example, the model may output a value of 0.7 benign and 0.3 malicious, indicating that there is a 70% confidence prediction that the binary is benign, and a 30% confidence prediction that the binary is malicious. In such implementations, the data processing system can utilize a soft-max function to isolate a single classification type.

The data processing system can determine whether the unknown binary is malicious (STEP 722). To determine whether the unknown binary is malicious, the data processing system can compare the output of the classification model to one or more thresholds to determine whether the threshold is satisfied. For example, if the classification model outputs a value that corresponds to a 50% confidence or greater that the unknown binary is malicious, the data processing system can determine that the binary is likely malicious. In some implementations, other threshold values are used, and may be accessed by the data processing system from one or more configuration settings configured by an external computing device, or by the request for classification received by an external computing device. If the data processing system satisfies a benign threshold (e.g., the output of the model is greater than 50% that the unknown binary is benign, etc.), the data processing system can determine that the unknown binary is not malicious. If the data processing system determines that the unknown binary is malicious, the data processing system can perform step 724 of the method 700. If the data processing system determines that the unknown binary is not malicious, the data processing system can perform step 726 of the method 700.

The data processing system can provide an indication that the unknown binary is malicious (STEP 724). The data processing system can generate one or more notifications, such as emails, SMS messages, push notifications, web browser pages, web browser messages, network pages, JSON messages, or any other type of indication that can be provided to an external computing device. Upon generating the notification, the data processing system can communicate the message via network (e.g., the network 110) to an external computing device that is designated to receive indications related to malicious classifications. In some implementations, the data processing system can include an identifier of the unknown binary in the notification, and can transmit the notification to display the identification of the binary and the classification type. In some implementations, the data processing system can transmit the notification to a computing device that was responsible for providing a request for classification. The data processing system can store the notification, along with an identifier of the unknown binary and its associated classification, in one or more data structures in the memory of the data processing system 105, or in one or more data structures in a database (e.g., database 115).

The data processing system can finish classifying the unknown binary (STEP 726). In some implementations, the data processing system can provide an indication, as described above in STEP 724, that the unknown binary is not malicious binary in response to determining that the binary is not malicious based on the output of the model. In some implementations, the data processing system can de-allocate any memory temporarily allocated to perform the operations described herein above with respect to method 600. In some implementations, the data processing system can set the counter register j to its respective initialization value, for example zero.

FIG. 8 shows the general architecture of an illustrative computer system 800 that may be employed to implement any of the computer systems discussed herein in accordance with some implementations. The computer system 800 can be used to provide information via the network 110 for display. The computer system 800 of FIG. 8 comprises one or more processors 820 communicatively coupled to memory 825, one or more communications interfaces 805, and one or more output devices 810 (e.g., one or more display units) and one or more input devices 815. The processors 820 can be included, for example, in the data processing system 105, or the other components of the system 100 such as the client devices 120A-N.

In the computer system 800 of FIG. 8, the memory 825 may comprise any computer-readable storage media, and may store computer instructions such as processor-executable instructions for implementing the various functionalities described herein for respective systems, as well as any data relating thereto, generated thereby, or received via the communications interface(s) or input device(s) (if present). Referring again to the system 800 of FIG. 8, the data processing systems can include the memory 825 to store information related to the sets of user identifiers, the generated vectors, among others. The processor(s) 820 shown in FIG. 8 may be used to execute instructions stored in the memory 825 and, in so doing, also may read from or write to the memory various information processed or generated pursuant to execution of the instructions.

The processor 820 of the computer system 800 shown in FIG. 8 also may be communicatively coupled to or control the communications interface(s) 805 to transmit or receive various information pursuant to execution of instructions. For example, the communications interface(s) 805 may be coupled to a wired or wireless network, bus, or other communication means and may therefore allow the computer system 800 to transmit information to or receive information from other devices (e.g., other computer systems). While not shown explicitly in the system of FIG. 8, one or more communications interfaces facilitate information flow between the components of the system 800. In some implementations, the communications interface(s) may be configured (e.g., via various hardware components or software components) to provide a website as an access portal to at least some aspects of the computer system 800. Examples of communications interfaces 805 include user interfaces (e.g., web pages), through which the user can communicate with the computer system 800.

The output devices 810 of the computer system 800 shown in FIG. 8 may be provided, for example, to allow various information to be viewed or otherwise perceived in connection with execution of the instructions. The input device(s) 815 may be provided, for example, to allow a user to make manual adjustments, make selections, enter data, or interact in any of a variety of manners with the processor during execution of the instructions. Additional information relating to a general computer system architecture that may be employed for various systems discussed herein is provided further herein.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs, i.e., one or more components of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or any combination thereof. Moreover, while a computer storage medium is not a propagated signal, a computer storage medium can include a source or destination of computer program instructions encoded in an artificially-generated propagated signal. The computer storage medium can also be, or be included in, one or more separate physical components or media (e.g., multiple CDs, disks, flash memory, solid-state memory, or other storage devices).

The features disclosed herein may be implemented on a laptop computer or other personal computer, a smartphone, other mobile phone, handheld computer, a tablet PC, or other computing device.

The operations described in this specification can be implemented as operations performed by a data processing apparatus on data stored on one or more computer-readable storage devices or received from other sources.

The terms "data processing apparatus", "data processing system", "user device", "client device", or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or an combination thereof. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative, functional, or procedural languages, and can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, flash memory, solid-state drives, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), plasma, or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can include any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system such as the data processing system 105 can include clients and servers. For example, the data processing system 105 can include one or more servers in one or more data centers or server farms. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any implementations or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a cloud computing environment.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed only in connection with one implementation are not intended to be excluded from a similar role in other implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation, and references to "an implementation," "some implementations," "an alternate implementation," "various implementation," "one implementation" or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided herein relate to controlling the display of content of information resources, the systems and methods described herein can include applied to other environments. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

It should be understood that the systems and methods described above may be provided as instructions in one or more computer programs recorded on or in one or more articles of manufacture, e.g., computer-readable media. The article of manufacture may be a floppy disk, a hard disk, a CD-ROM, a flash memory card, a PROM, a RAM, a ROM, or a magnetic tape. In general, the computer programs may be implemented in any programming language, such as LISP, Perl, Python, C, C++, C#, PROLOG, or in any byte code language such as JAVA. The software programs may be stored on or in one or more articles of manufacture as object code.

Having described certain embodiments of methods and systems, it will now become apparent to one of skill in the art that other embodiments incorporating the concepts of the disclosure may be used. Therefore, the disclosure should not be limited to certain embodiments, but rather should be limited only by the spirit and scope of the following claims.

What is claimed is:

1. A system for classifying malware based on the frequency of feature reuse, comprising:
   a data processing system including one or more processors coupled to a memory, the one or more processors configured to:
   identify, from a database:
      (1) a malicious feature frequency corresponding to a number of occurrences of a first feature in a plurality of known malicious binaries,
      (2) a benign feature frequency corresponding to a number of occurrences of the first feature in a plurality of known benign binaries, and
      (3) a first weight value of the first feature corresponding to a size of the first feature;
   generate a first reuse vector based on the malicious feature frequency and the benign feature frequency, the first reuse vector being a bit string comprising a first half and a second half, the first half comprising a first plurality of bits and the second half comprising a second plurality of bits, generation of the first reuse vector comprising:
      determining that the malicious feature frequency falls within a malicious threshold range;
      setting a first bit of the first plurality of bits to a binary one and a second bit of the first plurality of bits to a binary zero responsive to the determination that the malicious feature frequency falls within the malicious threshold range;
      determining that the benign feature frequency falls within a benign threshold range; and
      setting a first bit of the second plurality of bits to a binary one and a second bit of the second plurality of bits to a binary zero responsive to the determination that the benign feature frequency falls within the benign threshold range;
   determine that a training binary associated with a known classification includes the first feature and a second feature, wherein the second feature is associated with a second reuse vector and a second weight value corresponding to a size of the second feature;
   construct, responsive to the determination that the training binary includes the first feature and the second feature, a reuse tensor using the first reuse vector, the second reuse vector, the first weight value, and the second weight value; and
   train a malware classification model using the reuse tensor and the known classification associated with the training binary.

2. The system of claim 1, wherein the one or more processors are further configured to:
   scan the training binary to identify a number of occurrences of the first feature;
   compare the number of occurrences of the second feature to a second feature threshold to determine whether the second feature threshold is satisfied;
   scan the training binary to identify a number of occurrences of the second feature;
   compare the number of occurrences of the first feature to a first feature threshold to determine whether the first feature threshold is satisfied; and
   determine that the training binary includes the first feature and the second feature responsive to the first feature threshold being satisfied and the second feature threshold being satisfied.

3. The system of claim 1, wherein the one or more processors are further configured to:

concatenate the first half with the second half to generate the first reuse vector.

4. The system of claim 1, wherein the one or more processors are further configured to:
determine a minimum value of the reuse tensor and a maximum value of the reuse tensor;
normalize the reuse tensor using the minimum value and the maximum value to create a normalized reuse tensor; and
train the malware classification model using the normalized reuse tensor and the known classification associated with the first binary.

5. The system of claim 1, wherein the malware classification model is a first malware classification model associated with a first feature type, and the first feature and the second feature are each associated with the first feature type, and the one or more processors are further configured to:
determine that the training binary includes a third feature and a fourth feature, wherein the third feature is associated with a third reuse vector and a third weight value corresponding to the size of the third feature, and the fourth feature is associated with a fourth reuse vector and a fourth weight value corresponding to the size of the fourth feature, the third feature and the fourth feature associated with a second feature type;
construct, responsive to the determination that the first binary includes the third feature and the fourth feature, a second reuse tensor using the third reuse vector, the fourth reuse vector, the third weight value, and the fourth weight value; and
train a second malware classification model using the second reuse tensor, the second malware classification model used to classify binaries based on an input tensor, the first malware classification model, and a voting system.

6. The system of claim 1, wherein the one or more processors are further configured to:
parse the training binary to identify a first code block, the first code block comprising a first plurality of computer executable instructions;
hash the first plurality of computer readable instructions to generate a first hashed code block;
parse the training binary to identify a second code block, the second code block comprising a second plurality of computer executable instructions;
hash the second plurality of computer readable instructions to generate a second hashed code block; and
access the database using the first hashed code block and the second hashed code block to determine that the training binary includes the first feature and the second feature.

7. The system of claim 1, wherein the one or more processors are further configured to:
parse the training binary to identify a first API call, the first API call comprising a first function name;
hash the first function name to generate a first hashed API call;
parse the training binary to identify a second API call, the second API call comprising a second function name;
hash the second function name to generate a second hashed API call; and
access the database using the first hashed API call and the second hashed API call to determine that the training binary includes the first feature and the second feature.

8. The system of claim 1, wherein the one or more processors are further configured to:

parse the training binary to identify a first string, the first string comprising a first plurality of characters;
parse the training binary to identify a second string, the second string comprising a second plurality of characters; and
access the database using the first string and the second string to determine that the training binary includes the first feature and the second feature.

9. A method of classifying malware based on the frequency of feature reuse, the method comprising:
identifying, by a data processing system comprising one or more processors coupled to a memory, from a database:
(1) a malicious feature frequency corresponding to a number of occurrences of a first feature in a plurality of known malicious binaries,
(2) a benign feature frequency corresponding to a number of occurrences of the first feature in a plurality of known benign binaries, and
(3) a first weight value of the first feature corresponding to a size of the first feature;
generating, by the data processing system, a first reuse vector based on the malicious feature frequency and the benign feature frequency, the first reuse vector being a bit string comprising a first half and a second half, the first half comprising a first plurality of bits and the second half comprising a second plurality of bits, said generating the first reuse vector comprising:
determining that the malicious feature frequency falls within a malicious threshold range;
setting a first bit of the first plurality of bits to a binary one and a second bit of the first plurality of bits to a binary zero responsive to the determination that the malicious feature frequency falls within the malicious threshold range;
determining that the benign feature frequency falls within a benign threshold range; and
setting a first bit of the second plurality of bits to a binary one and a second bit of the second plurality of bits to a binary zero responsive to the determination that the benign feature frequency falls within the benign threshold range;
determining, by the data processing system, that a training binary associated with a known classification includes the first feature and a second feature, wherein the second feature is associated with a second reuse vector and a second weight value corresponding to a size of the second feature;
constructing, by the data processing system, responsive to determining that the training binary includes the first feature and the second feature, a reuse tensor using the first reuse vector, the second reuse vector, the first weight value, and the second weight value; and
training, by the data processing system, a malware classification model using the reuse tensor and the known classification associated with the training binary.

10. The method of claim 9, further comprising:
scanning, by the data processing system, the training binary to identify a number of occurrences of the first feature;
comparing, by the data processing system, the number of occurrences of the second feature to a second feature threshold to determine whether the second feature threshold is satisfied;
scanning, by the data processing system, the training binary to identify a number of occurrences of the second feature;

comparing, by the data processing system, the number of occurrences of the first feature to a first feature threshold to determine whether the first feature threshold is satisfied; and
determining, by the data processing system, that the training binary includes the first feature and the second feature responsive to the first feature threshold being satisfied and the second feature threshold being satisfied.

11. The method of claim 9, further comprising:
concatenating, by the data processing system, the first half with the second half to generate the first reuse vector.

12. The method of claim 9, further comprising:
determining, by the data processing system, a minimum value of the reuse tensor and a maximum value of the reuse tensor;
normalizing, by the data processing system, the reuse tensor using the minimum value and the maximum value to create a normalized reuse tensor; and
training, by the data processing system, the malware classification model using the normalized reuse tensor and the known classification associated with the first binary.

13. The method of claim 9, wherein the malware classification model is a first malware classification model associated with a first feature type, and the first feature and the second feature are each associated with the first feature type, the method further comprising:
determining, by the data processing system, that the training binary includes a third feature and a fourth feature, wherein the third feature is associated with a third reuse vector and a third weight value corresponding to the size of the third feature, and the fourth feature is associated with a fourth reuse vector and a fourth weight value corresponding to the size of the fourth feature, the third feature and the fourth feature associated with a second feature type;
constructing, by the data processing system, responsive to the determination that the first binary includes the third feature and the fourth feature, a second reuse tensor using the third reuse vector, the fourth reuse vector, the third weight value, and the fourth weight value; and
training, by the data processing system, a second malware classification model using the second reuse tensor, the second malware classification model used to classify binaries based on an input tensor, the first malware classification model, and a voting system.

14. The method of claim 9, further comprising:
parsing, by the data processing system, the training binary to identify a first code block, the first code block comprising a first plurality of computer executable instructions;
hashing, by the data processing system, the first plurality of computer readable instructions to generate a first hashed code block;
parsing, by the data processing system, the training binary to identify a second code block, the second code block comprising a second plurality of computer executable instructions;
hashing, by the data processing system, the second plurality of computer readable instructions to generate a second hashed code block; and
accessing, by the data processing system, the database using the first hashed code block and the second hashed code block to determine that the training binary includes the first feature and the second feature.

15. The method of claim 9, further comprising:
parsing, by the data processing system, the training binary to identify a first API call, the first API call comprising a first function name;
hashing, by the data processing system, the first function name to generate a first hashed API call;
parsing, by the data processing system, the training binary to identify a second API call, the second API call comprising a second function name;
hashing, by the data processing system, the second function name to generate a second hashed API call; and
accessing, by the data processing system, the database using the first hashed API call and the second hashed API call to determine that the training binary includes the first feature and the second feature.

16. The method of claim 9, further comprising:
parsing, by the data processing system, the training binary to identify a first string, the first string comprising a first plurality of characters;
parsing, by the data processing system, the training binary to identify a second string, the second string comprising a second plurality of characters; and
accessing, by the data processing system, the database using the first string and the second string to determine that the training binary includes the first feature and the second feature.

17. One or more computer storage media encoded with computer program instructions that when executed by one or more computers cause the one or more computers to perform operations for classifying malware based on the frequency of feature reuse comprising:
identifying, from a database:
(1) a malicious feature frequency corresponding to a number of occurrences of a first feature in a plurality of known malicious binaries,
(2) a benign feature frequency corresponding to a number of occurrences of the first feature in a plurality of known benign binaries, and
(3) a first weight value of the first feature corresponding to a size of the first feature;
generating, by the data processing system, a first reuse vector based on the malicious feature frequency and the benign feature frequency, the first reuse vector being a bit string comprising a first half and a second half, the first half comprising a first plurality of bits and the second half comprising a second plurality of bits, said generating the first reuse vector comprising:
determining that the malicious feature frequency falls within a malicious threshold range;
setting a first bit of the first plurality of bits to a binary one and a second bit of the first plurality of bits to a binary zero responsive to the determination that the malicious feature frequency falls within the malicious threshold range;
determining that the benign feature frequency falls within a benign threshold range; and
setting a first bit of the second plurality of bits to a binary one and a second bit of the second plurality of bits to a binary zero responsive to the determination that the benign feature frequency falls within the benign threshold range;
determining, by the data processing system, that a training binary associated with a known classification includes the first feature and a second feature, wherein the second feature is associated with a second reuse vector and a second weight value corresponding to a size of the second feature;

constructing, by the data processing system, responsive to determining that the training binary includes the first feature and the second feature, a reuse tensor using the first reuse vector, the second reuse vector, the first weight value, and the second weight value; and training, by the data processing system, a malware classification model using the reuse tensor and the known classification associated with the training binary.

18. The one or more computer storage media of claim 17, further comprising instructions to perform operations comprising:

scanning, by the data processing system, the training binary to identify a number of occurrences of the first feature;

comparing, by the data processing system, the number of occurrences of the second feature to a second feature threshold to determine whether the second feature threshold is satisfied;

scanning, by the data processing system, the training binary to identify a number of occurrences of the second feature;

comparing, by the data processing system, the number of occurrences of the first feature to a first feature threshold to determine whether the first feature threshold is satisfied; and determining, by the data processing system, that the training binary includes the first feature and the second feature responsive to the first feature threshold being satisfied and the second feature threshold being satisfied.

19. The one or more computer storage media of claim 17, further comprising instructions to perform operations comprising:

concatenating, by the data processing system, the first half with the second half to generate the first reuse vector.

20. The one or more computer storage media of claim 17, further comprising instructions to perform operations comprising:

determining, by the data processing system, a minimum value of the reuse tensor and a maximum value of the reuse tensor;

normalizing, by the data processing system, the reuse tensor using the minimum value and the maximum value to create a normalized reuse tensor; and training, by the data processing system, the malware classification model using the normalized reuse tensor and the known classification associated with the first binary.

21. The one or more computer storage media of claim 17, wherein the malware classification model is a first malware classification model associated with a first feature type, and the first feature and the second feature are each associated with the first feature type, the method further comprising:

determining, by the data processing system, that the training binary includes a third feature and a fourth feature, wherein the third feature is associated with a third reuse vector and a third weight value corresponding to the size of the third feature, and the fourth feature is associated with a fourth reuse vector and a fourth weight value corresponding to the size of the fourth feature, the third feature and the fourth feature associated with a second feature type;

constructing, by the data processing system, responsive to the determination that the first binary includes the third feature and the fourth feature, a second reuse tensor using the third reuse vector, the fourth reuse vector, the third weight value, and the fourth weight value; and training, by the data processing system, a second malware classification model using the second reuse tensor, the second malware classification model used to classify binaries based on an input tensor, the first malware classification model, and a voting system.

22. The one or more computer storage media of claim 17, further comprising instructions to perform operations comprising:

parsing, by the data processing system, the training binary to identify a first code block, the first code block comprising a first plurality of computer executable instructions;

hashing, by the data processing system, the first plurality of computer readable instructions to generate a first hashed code block;

parsing, by the data processing system, the training binary to identify a second code block, the second code block comprising a second plurality of computer executable instructions;

hashing, by the data processing system, the second plurality of computer readable instructions to generate a second hashed code block; and accessing, by the data processing system, the database using the first hashed code block and the second hashed code block to determine that the training binary includes the first feature and the second feature.

23. The one or more computer storage media of claim 17, further comprising instructions to perform operations comprising:

parsing, by the data processing system, the training binary to identify a first API call, the first API call comprising a first function name;

hashing, by the data processing system, the first function name to generate a first hashed API call;

parsing, by the data processing system, the training binary to identify a second API call, the second API call comprising a second function name;

hashing, by the data processing system, the second function name to generate a second hashed API call; and accessing, by the data processing system, the database using the first hashed API call and the second hashed API call to determine that the training binary includes the first feature and the second feature.

24. The one or more computer storage media of claim 17, further comprising instructions to perform operations comprising:

parsing, by the data processing system, the training binary to identify a first string, the first string comprising a first plurality of characters;

parsing, by the data processing system, the training binary to identify a second string, the second string comprising a second plurality of characters; and accessing, by the data processing system, the database using the first string and the second string to determine that the training binary includes the first feature and the second feature.

* * * * *